(12) United States Patent
Jiang et al.

(10) Patent No.: US 12,105,722 B2
(45) Date of Patent: Oct. 1, 2024

(54) BUILDING AND USING A SPARSE TIME SERIES DATABASE (TSDB)

(71) Applicant: INTERNATIONAL BUSINESS MACHINES CORPORATION, Armonk, NY (US)

(72) Inventors: Peng Hui Jiang, Beijing (CN); Jun Su, Beijing (CN); Sheng Yan Sun, Beijing (CN); Hong Mei Zhang, Beijing (CN); Meng Wan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 17/817,806

(22) Filed: Aug. 5, 2022

(65) Prior Publication Data

US 2024/0045878 A1 Feb. 8, 2024

(51) Int. Cl.
*G06F 16/2458* (2019.01)
*G06F 16/22* (2019.01)
*G06F 16/2455* (2019.01)

(52) U.S. Cl.
CPC ...... *G06F 16/2477* (2019.01); *G06F 16/2228* (2019.01); *G06F 16/24556* (2019.01)

(58) Field of Classification Search
CPC ........... G06F 16/2477; G06F 16/24556; G06F 16/2228
See application file for complete search history.

(56) References Cited

U.S. PATENT DOCUMENTS

| 9,385,751 | B2 | 7/2016 | Kletter |
| 9,578,046 | B2 | 2/2017 | Baker |
| 11,397,752 | B1* | 7/2022 | Goyal ................ G06F 11/3409 |
| 2004/0236727 | A1 | 11/2004 | Day et al. |
| 2006/0259475 | A1* | 11/2006 | Dehlinger .............. G06F 16/93 |
| 2013/0318069 | A1* | 11/2013 | Alu .................. G06F 16/24524 |
| | | | 707/718 |
| 2014/0136563 | A1 | 5/2014 | Pompey et al. |
| 2017/0116310 | A1* | 4/2017 | Walker ............... G06F 12/0868 |

(Continued)

OTHER PUBLICATIONS

Mell et al., "Effectively and Securely Using the Cloud Computing Paradigm" dated Oct. 7, 2009, NIST, Information Technology Laboratory, 80 pp.

(Continued)

*Primary Examiner* — Allen S Lin
(74) *Attorney, Agent, or Firm* — KONRAD, RAYNES, DAVDA & VICTOR LLP; Janaki K. Davda

(57) ABSTRACT

Provided are techniques for building and using a sparse Time Series Database (TSDB). Time series records are received from a native TSDB, where each of the time series records includes a timestamp and one or more tags. Timeslots are determined for shards for the sparse TSDB based on the timestamp included in each of the time series records. The sparse TSDB is built by creating the shards for the determined timeslots and storing the time series records in the shards, while filling in empty ranges in the shards. A query that specifies at least one of the one or more tags is received. It is determined whether to execute the query against the sparse TSDB, and, in response to a determination to execute the query against the sparse TSDB, the query is executed against the sparse TSDB to generate results that are returned.

17 Claims, 20 Drawing Sheets

(56) References Cited

U.S. PATENT DOCUMENTS

2021/0034620 A1 2/2021 Shah et al.
2021/0319002 A1 10/2021 Ryan et al.
2022/0253435 A1* 8/2022 Chen .................... G06F 16/434
2023/0121897 A1* 4/2023 Liu ........................ G01H 1/003
702/56

OTHER PUBLICATIONS

Mell et al., "The NIST Definition of Cloud Computing" dated Sep. 2011, Recommendations of the National Institute of Standards and Technology, 7 pp.
"OpenTSDB indexing on keys" [online] [retrieved May 3, 2022], pp. 2, [https://stackoverflow.com/questions/40619467/ppentsdb-indexing-on-keys].

* cited by examiner

| Row Key | Columns: Data | | | | | Columns: Row Key Identifier (ID) | |
|---|---|---|---|---|---|---|---|
| | Metric Name | Metric Value | Timestamp | tagk | tagv | Metric Indicator | Tag Indicator |
| 001 | | | | | | | |
| ... | | | | | | | |
| 046 | | | | | | | |
| ... | | | | | | | |
| 052 | proc.loadavg.1m | 0.42 | 1234566890 | | | | |
| ... | | | | | | | |
| 086 | proc.temp | 35.6 | 1234566890 | | | | |
| host | | | 1234566890 | host | web42 | | 001 |
| proc.loadavg.1m | | | 1234566890 | | | 052 | |
| pool | | | 1234566890 | pool | static | | 046 |
| proc.temp | | | 1234566866 | | | 086 | |
| ... | | | | | | | |

FIG. 3

BUILDING AND USING A SPARSE TIME SERIES DATABASE (TSDB)

BACKGROUND

Embodiments of the invention relate to building and using a sparse Time Series Database (TSDB).

A TSDB may be described as a software system that is optimized for storing and serving time series data through associated pairs of time and value. In some fields, time series data may be referred to as profiles, curves, traces or trends.

Time series data may also be described as measurements or events that are tracked, monitored, downsampled, and aggregated over time. The time series data may be server metrics, application performance monitoring data, network data, sensor data, events, clicks, trades in a market, and many other types of analytics data.

TSDBs are a fast-growing segment in the database industry. Time series databases also have architectural design properties that make them different from other types of databases. However, while TSDBs store raw values as long as the user wants, querying for wide timespans across large amounts of raw data may slow queries to a crawl and potentially cause an Out Of Memory (OOM) shutdown on a virtual machine.

SUMMARY

In accordance with certain embodiments, a computer-implemented method is provided for building and using a sparse time series database (TSDB). In such embodiments, time series records are received from a native TSDB, where each of the time series records includes a timestamp and one or more tags. Timeslots are determined for shards for the sparse TSDB based on the timestamp included in each of the time series records. The sparse TSDB is built by creating the shards for the determined timeslots and storing the time series records in the shards, while filling in empty ranges in the shards. A query that specifies at least one of the one or more tags is received. It is determined whether to execute the query against the sparse TSDB based on whether the query is for particular time series records that are queried frequently and whether a density of the time series records in the native TSDB is larger than a sparse threshold. In response to a determination to execute the query against the sparse TSDB, the query is executed against the sparse TSDB to generate results, and the results are returned.

In accordance with other embodiments, a computer program product is provided for building and using a sparse time series database (TSDB). The computer program product comprises a computer readable storage medium having program code embodied therewith, the program code executable by at least one processor. In such embodiments, time series records are received from a native TSDB, where each of the time series records includes a timestamp and one or more tags. Timeslots are determined for shards for the sparse TSDB based on the timestamp included in each of the time series records. The sparse TSDB is built by creating the shards for the determined timeslots and storing the time series records in the shards, while filling in empty ranges in the shards. A query that specifies at least one of the one or more tags is received. It is determined whether to execute the query against the sparse TSDB based on whether the query is for particular time series records that are queried frequently and whether a density of the time series records in the native TSDB is larger than a sparse threshold. In response to a determination to execute the query against the sparse TSDB, the query is executed against the sparse TSDB to generate results, and the results are returned.

In accordance with yet other embodiments, a computer system is provided for building and using a sparse time series database (TSDB). The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories. In such embodiments, time series records are received from a native TSDB, where each of the time series records includes a timestamp and one or more tags. Timeslots are determined for shards for the sparse TSDB based on the timestamp included in each of the time series records. The sparse TSDB is built by creating the shards for the determined timeslots and storing the time series records in the shards, while filling in empty ranges in the shards. A query that specifies at least one of the one or more tags is received. It is determined whether to execute the query against the sparse TSDB based on whether the query is for particular time series records that are queried frequently and whether a density of the time series records in the native TSDB is larger than a sparse threshold. In response to a determination to execute the query against the sparse TSDB, the query is executed against the sparse TSDB to generate results, and the results are returned.

Embodiments advantageously provide sparse TSDBs to enhance querying for wide timespans across large amounts of raw data to avoid slow queries and to avoid an Out Of Memory (OOM) shutdown on a virtual machine. In addition, embodiments advantageously provide a sparse TSDB in addition to the native TSDB to support more efficient querying.

In accordance with some embodiments, metrics and the one or more tags are extracted from the time series records in the native TSDB, the metrics are aggregated based on the one or more tags and based on the timestamp included in each of the time series records, and the metrics and the one or more tags are grouped according to the aggregation. Such analysis advantageously prepares the data for affinity analysis.

In accordance with other embodiments, an affinity of the one or more tags is determined based on the timestamp included in each of the time series records. Such a determination of affinity determines relationships among a large set of tags.

In accordance with yet other embodiments, in response to determining that the query is not to be executed against the sparse TSDB, the query is executed against the native TSDB. This determination advantageously selects the native TSDB for executing the query when it is more efficient to do so.

In accordance with additional embodiments, the time series records are transformed by: normalizing the time series records, identifying the one or more tags in the time series records, and sorting the time series records according to the timestamp included in each of the time series records and the one or more tags. This allows for more efficient storage of the time series records into the sparse TSDB.

In accordance with yet additional embodiments, the sparse TSDB is accessed by MMap access and direct access, and where the native TSDB is accessed by random access. This advantageously allows for different types of access.

In accordance with further embodiments, a Software as a Service (SaaS) is configured to perform the operations of the computer-implemented method. This advantageously allows for the operations of embodiments to be provided in a cloud environment.

BRIEF DESCRIPTION OF THE SEVERAL VIEWS OF THE DRAWINGS

Referring now to the drawings in which like reference numbers represent corresponding parts throughout:

FIG. 3 illustrates an example table 300 of time series records in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments advantageously provide the ability of timestamp data storage and compression, data lifecycle management, data summarization, time series aware queries, etc. While a TSDB stores raw values as long as a user wants, embodiments enhance querying for wide timespans across large amounts of raw data to avoid slow queries and to avoid an Out Of Memory (OOM) shutdown on a virtual machine (e.g., a Java® Virtual Machine (JVM), Java is a registered trademark of Oracle Corporation in the United States and/or other countries). Also, embodiments avoid seeing hot spots within a cluster of Not only Structured Query Language (NoSQL) databases when there are multiple tags (e.g., tags).

In certain embodiments, native and sparse TSDB's are optimized for using the sparse TSDB for time series records that are used and queried frequently and when the density of the time series records of the native TSDB is larger than the sparse threshold, resulting in millisecond level query times over months of data. In this manner, embodiments advantageously better leverage the characteristic of both sparse and native TSDBs, optimize query performance by using the sparse TSDB under certain conditions, address potential bottlenecks based on direct access to TSDB time series records, and optimize TSDB data life cycle (which may be efficiently used without fixed consumption).

Figure 1:
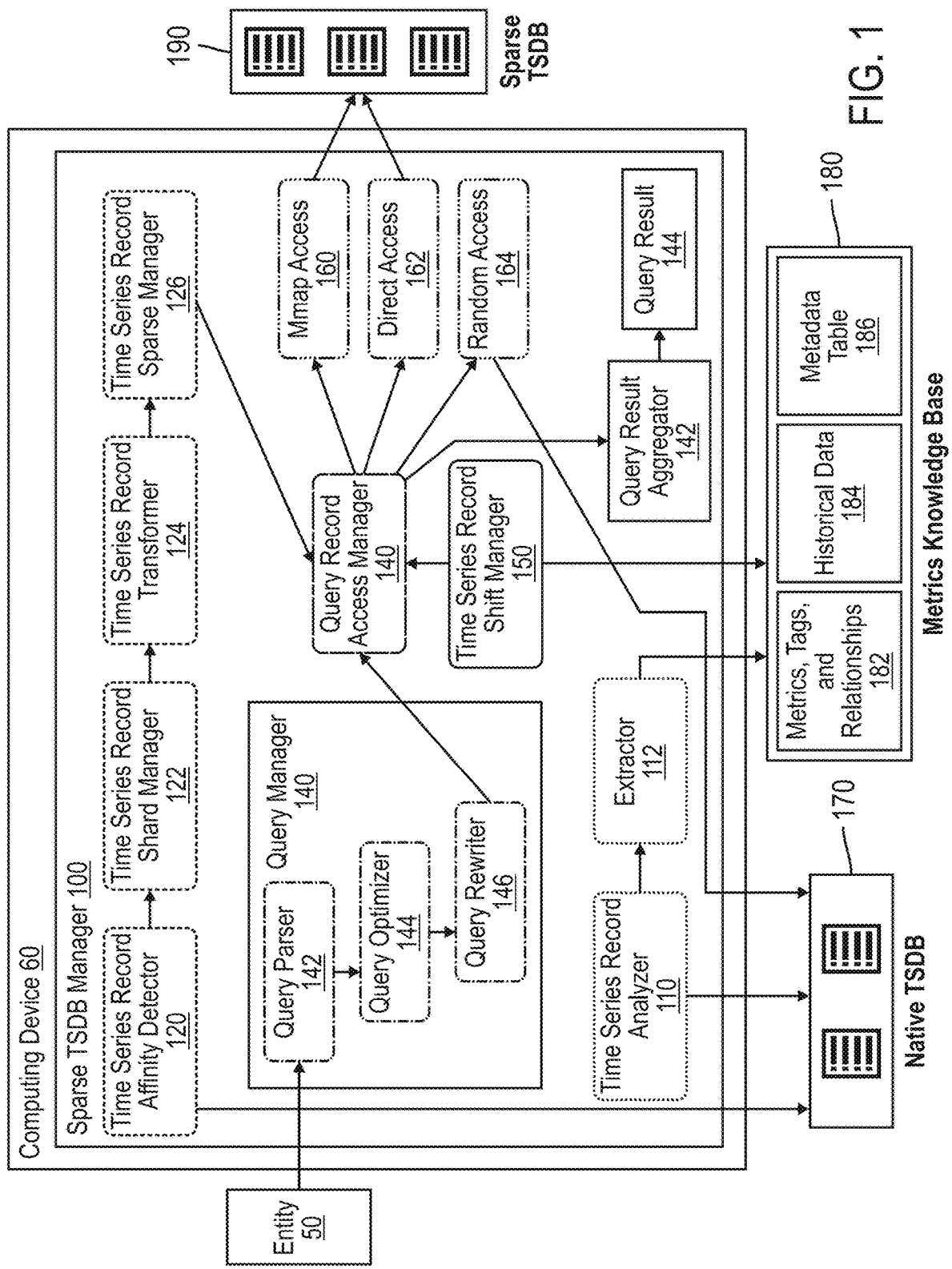
FIG. 1 illustrates, in a block diagram, a computing environment in accordance with certain embodiments.

FIG. 1 illustrates, in a block diagram, a computing environment in accordance with certain embodiments. A computing device 60 includes a sparse TSDB manager 100 and is connected to a native TSDB 170, a metrics knowledge base 180, and a sparse TSDB 190. In certain embodiments, the native TSDB 170 is a multi-dimensional TSDB, with one of the multiple dimensions being time (e.g., represented by a timestamp), and the sparse TSDB manager 100 builds and uses the sparse TSDB 190 to improve query performance based on the multiple dimensions.

The sparse TSDB manager 100 includes time series record analyzer 110 and an extractor 112 for performing initial processing and analysis of data in the native TSDB 170 and the metrics knowledge base 180. In certain embodiments, the extractor 112 extracts the metrics and the tags from time series records in the native TSDB 170.

The sparse TSDB manager 100 includes a time series record affinity detector 120, a time series record shard manager 122, a time series record transformer 124, and a time series record sparse manger 126 for building the sparse TSDB 190. The sparse TSDB manager 100 includes a query manager 130, which includes a query parser 132, a query optimizer 134, and a query rewriter 136 for processing a query from an entity 50. The entity 50 may be a person, an application, a robot, another computing device, etc. The sparse TSDB manager 100 includes a time series record shift manager 150 for determining whether to execute the query using the sparse TSDB or the native TSDB. The sparse TSDB manager 100 includes a query record access manager 140 for executing the query using MMap access 160 against the sparse TSDB 190 or using direct access 162 against the sparse TSDB 190, a query result aggregator 142, and the query result 144. The query may also be executed by random access 164 against the native TSDB 170. MMap may be described as memory mapped file Input/Output (I/O).

The native TSDB 170 includes time series records and may include other data. In certain embodiments, a time series record includes one or more metrics and/or one or more tags. A metric may be described as a measurement (e.g., of performance, consumption, productivity, etc. for a software application, a computer processor, a computer node, etc.). A tag may be described as metadata collected at a particular timestamp (e.g., about a software application, a computer processor, a computer node, etc.). A timestamp may be described as indicating a particular time of a particular day, while a timeslot may be described as a range of timestamps (e.g., months, quarters, years, etc.).

With embodiments, the time series records in the native TSDB 170 may also be stored in the sparse TSDB 190. In certain embodiments, the native TSDB 170 is built with first shards associated with first timeslots (e.g., quarters in a year), and the sparse TSDB 190 is built with second shards associated with second timeslots (e.g., months in a year). In certain embodiments, the number of first shards (e.g., 4) may be different from the number of second shards (e.g., 12). In certain embodiments, the naming convention is as follows with the ellipses indicating that there may be any number of tag/value pairs:

metric_name_metric_value(tagk, tagv) . . .

The entity 50 may submit a query that pinpoints relevant time series by the tags. That is, the tags are searchable. For example, if the entity 50 wants to see how a specific Solid State Drive (SSD) model performs on a specific host, the entity may include tags referencing the specific SSD model and the specific host in the query. As another example, if the entity 50 wants to see how the specific SSD model performs in a specific pool, the entity 50 may include tags referencing the specific SSD model and the specific pool in the query. As yet another example, if the entity 50 wants to see how the specific SSD model performs on a specific host and in a specific pool, the entity 50 may include tags referencing the specific SSD model, the specific host, and the specific pool in the query.

In certain embodiments, a time series record has the following format:

Metric Name/Value+TimeStamp+Tag/Value pairs

In certain embodiments, a row has the following format:

Row Key+Metric Name/Value+Timestamp+optional Tag/Value pairs

Figure 2:
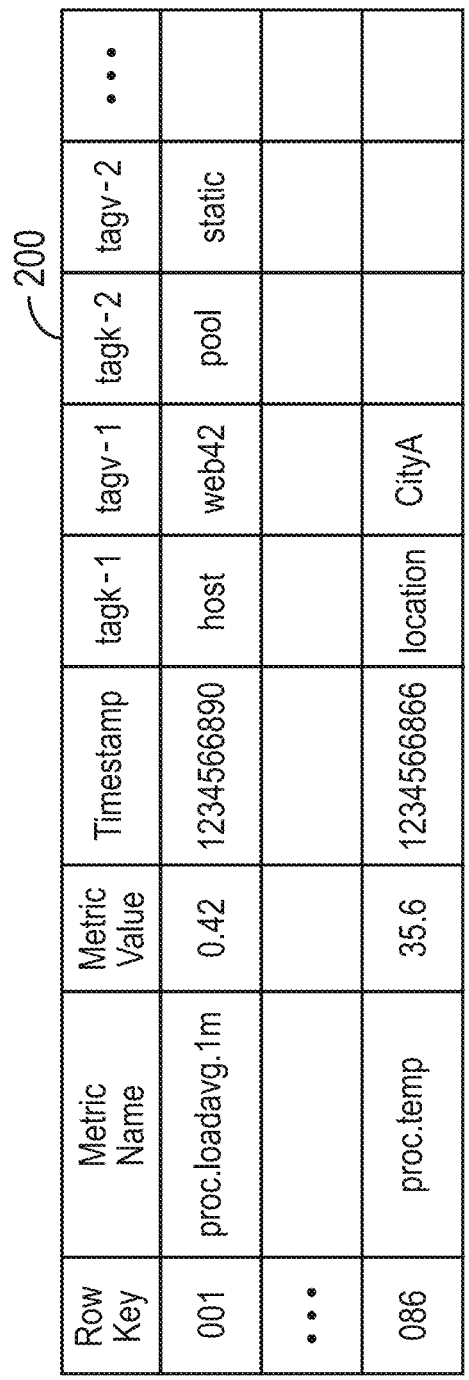
FIG. 2 illustrates an example table of time series records in a first format in accordance with certain embodiments.

FIG. 2 illustrates an example table 200 of time series records in a first format in accordance with certain embodiments. Each row of the example table 200 represents a time series record and includes columns for: a row key, a metric name, a metric value, a timestamp, a first tag (tagk-1), a value of the first tag (tagv-1), a second tag (tagk-2), a value of the second tag (tagv-2), and optionally other columns to store additional tag and value data. Although first and second tags and associated values are illustrated, in other embodiments, the row may have columns for one tag and an associated value.

In the example table 200, row key "001" has a metric name of "proc.loadavg.1m", a metric value of "0.42", a timestamp of "1234567890", a first tag of "host" with a value of "web42", and a second tag of "pool" with a value of "static". In the example table 200, row key "087" has a metric name of "proc.temp" with a value of "35.7", a timestamp of "1234567877", and a metric name of "location" with a value of "CityA".

In certain embodiments, among a set of time series records for a set of timestamps, some metrics are not present at all of the timestamps (e.g., the "proc.temp" metric is not present at timestamp "1234567890"), some time series records do not include all of the tags from the set of possible tags (e.g., the "proc.temp" metric does not have the "host" and "pool" tags), and the order of the metrics and the tags within the set of the time series records may vary (e.g., "host" may be listed before "pool" for one timestamp and "pool" may be listed before "host" at another timestamp).

FIG. 3 illustrates an example table 300 of time series records in a second format in accordance with certain embodiments. In this example table 300, a row includes a column for a row key, columns for data, and columns for a row key identifier. The columns for data include columns for: a metric name, a metric value, a timestamp, a tag (tagk), and a value of the tag (tagv). The columns for a row key include columns for metric and tag. For example, in table 300, row key "001" has a timestamp of "1234567890", a tag of "host", and a tag value of "web42". As another example, row key "052" has a metric name of "proc.loadavg.1m" and a metric value of "0.42". Also, row key "host" has a tag indicator of "001", which indicates that "host" is a tag and is associated with row key "001". Row key "proc.loadavg.1m" has a metric indicator of "052", which indicates that "proc.loadavg.1m" is a metric and is associated with row key "052".

An example query of metric "proc.loadavg.1m" between 12:05 and 13:00 is a fast range scan to batch load the data. However, if the query specifies the metric "proc.loadavg.1m" and the tag "host" (e.g., "proc.loadavg.1m{host=web1}"), then the "proc.loadavg.1m" time series records are scanned within the time range, then host=web1 time series records are filtered out in memory. For example, if there are one million hosts per minute, then one million time series records are loaded in one minute, some time series records are filtered out where the "host" tag does not have the value "web1", and the result may keep one time series record.

The time series record analyzer 110 analyzes the time series records in the native TSDB 170, extracts metrics and tags, along with their relationships, and stores the metrics, tags, and relationships 182 in the metrics knowledge base 180. The knowledge base 180 also stores historical data 184 (e.g., on queries that have been previously executed, metrics that have been previously extracted, tags that have been previously extracted, etc.). The knowledge base 180 further stores a metadata table 186. In certain embodiments, the time series record sparse manager 126 generates a metadata table 186 that indicates whether to use a sparse TSDB 1250 or a native TSDB 1200 and indicates the locations of empty ranges and the valid data.

Figure 4:
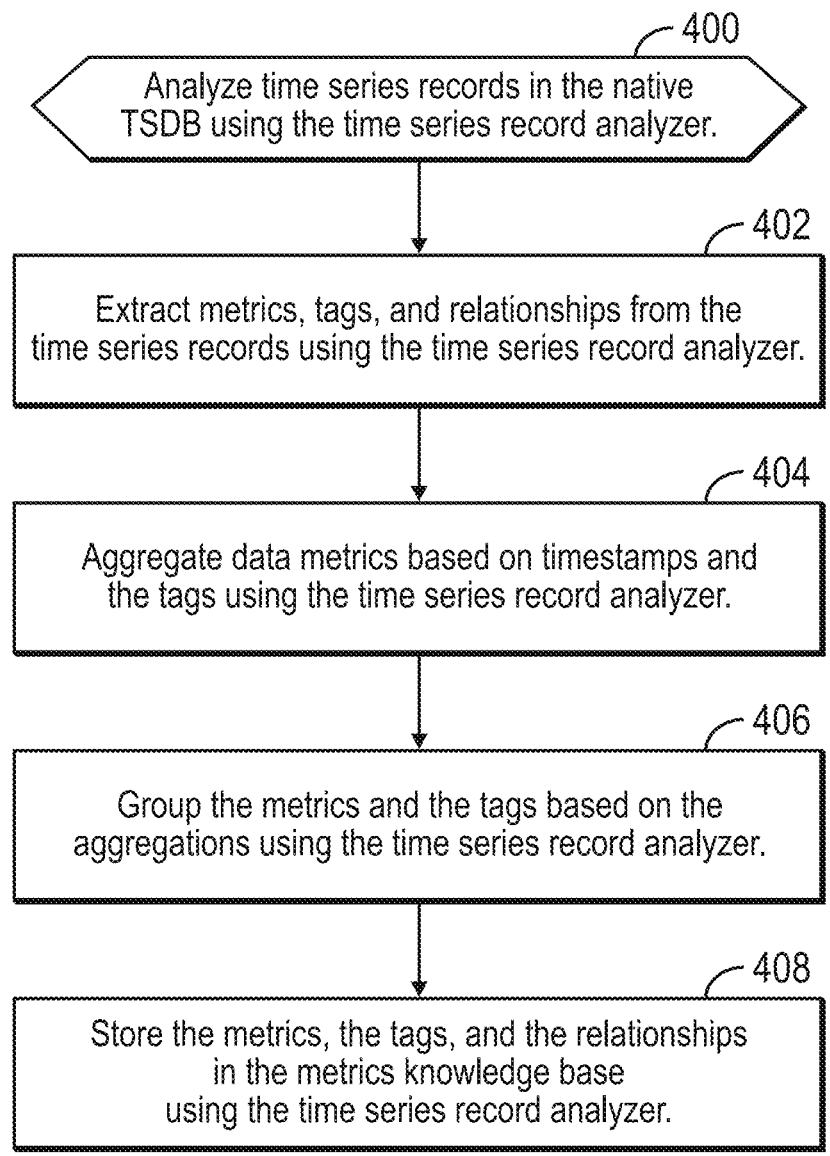
FIG. 4 illustrates, in a flowchart, operations for processing time series records in accordance with certain embodiments.

FIG. 4 illustrates, in a flowchart, operations for processing time series records in accordance with certain embodiments. Control begins at block 400 with the sparse TSDB manager 100 analyzing time series records in the native TSDB 170 using the time series record analyzer 110. In block 402, the sparse TSDB manager 100 extracts metrics, tags, and relationships from the time series records using the time series record analyzer 110. In block 404, the sparse TSDB manager 100 aggregates data metrics based on timestamps and the tags using the time series record analyzer 110. In block 406, the sparse TSDB manager 100 groups the metrics and the tags based on the aggregations using the time series record analyzer 110. In block 408, the sparse TSDB manager 100 stores the metrics, the tags, and the relationships 182 in the metrics knowledge base 180 using the time series record analyzer 110.

In particular, the time series record analyzer 110 analyzes time series records to extract tags from the time series records, aggregates the metrics based on the timestamps and the tags, and groups the metrics and the tags. In certain embodiments, the aggregation includes: Min, Max, Avg, Median, Sum, Count, Percentile Ranks, and others.

In certain embodiments, the grouping of the metrics and the tags is based on historical data 184 from the metrics knowledge base 180. In certain embodiments, the grouping of the metrics and the tags is based on one or more rules in combination with the historical data 184.

The historical data 184 of the metrics knowledge base 180 may indicate that one metric may be represented with different units, such as seconds, millisecond, etc. In addition, similar metrics may be deduced by the value of the metrics, etc., and such a result may be saved in the historical data 184 of the metrics knowledge base 180 for future use.

Figure 5:
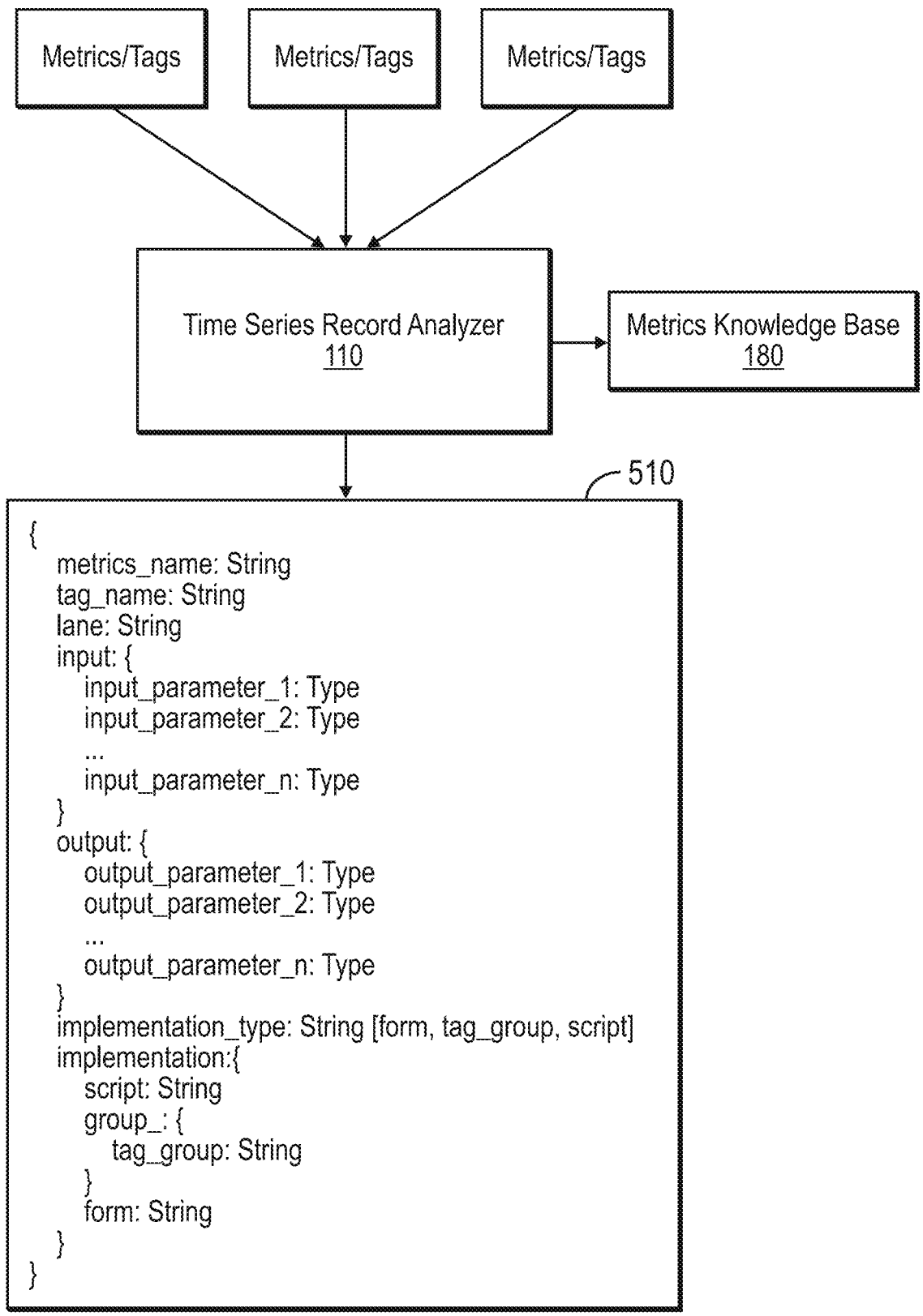
FIG. 5 illustrates analysis of metrics and tags in accordance with certain embodiments.

FIG. 5 illustrates analysis of metrics and tags in accordance with certain embodiments. In FIG. 5, the time series record analyzer 110 extracts the metrics and tags from the time series records in the native TSDB 170, stores the metrics and tags in the metrics knowledge base 180, and generates the output 510 of a grouping of the metrics and tags. The output 510 is generated by the time series record analyzer 110 and represents the result of metrics analysis. For example, the output 510 may indicate how to group input metrics into one metric, how to split one input metric into multiple metrics, etc. In this example, "tag_group" is used to represent the analysis technique for grouping.

The time series record affinity detector 120 determines the affinity of multiple combinations of tags for a given timestamp and decides how to partition the sparse TSDB 190 and build a shard map. The affinity of tags may indicate that a group of tags often occur together at different timestamps. Then, the shards may be created so that, for example, each shard stores time series records for a particular month and a particular host.

A shard ("database shard") may be described as a horizontal partition of data in the native TSDB 170. A shard map is an index to the data in the shards and may be described as having entries with keys, and each of the keys maps to a portion of a shard. Affinity may be described as a relationship relative to time (e.g., occurring at the same timestamp) and, optionally, relative to other factors (e.g., tags for "host" having a same timestamp have affinity by time and by "host"). For example, tags associated with a particular month may be said to have affinity with each other and may be stored in a shard for that month.

The time series record affinity detector 120 receives time series records with the same metric, but with different tags that are associated with timestamps. Then, the time series record affinity detector 120 maps the occurrence of the tag into a chronological matrix, such as the following:

1 0 0
0 1 0
0 0 1

In the chronological matrix, each intersection of a row and column represents a different timestamp. In the chronological matrix, for a particular timestamp, a first value (e.g., "1") is used to indicate occurrence of the tag in that particular timestamp, while a second value (e.g., "0") is used to indicate non-occurrence of the tag in that particular timestamp.

Figure 6:
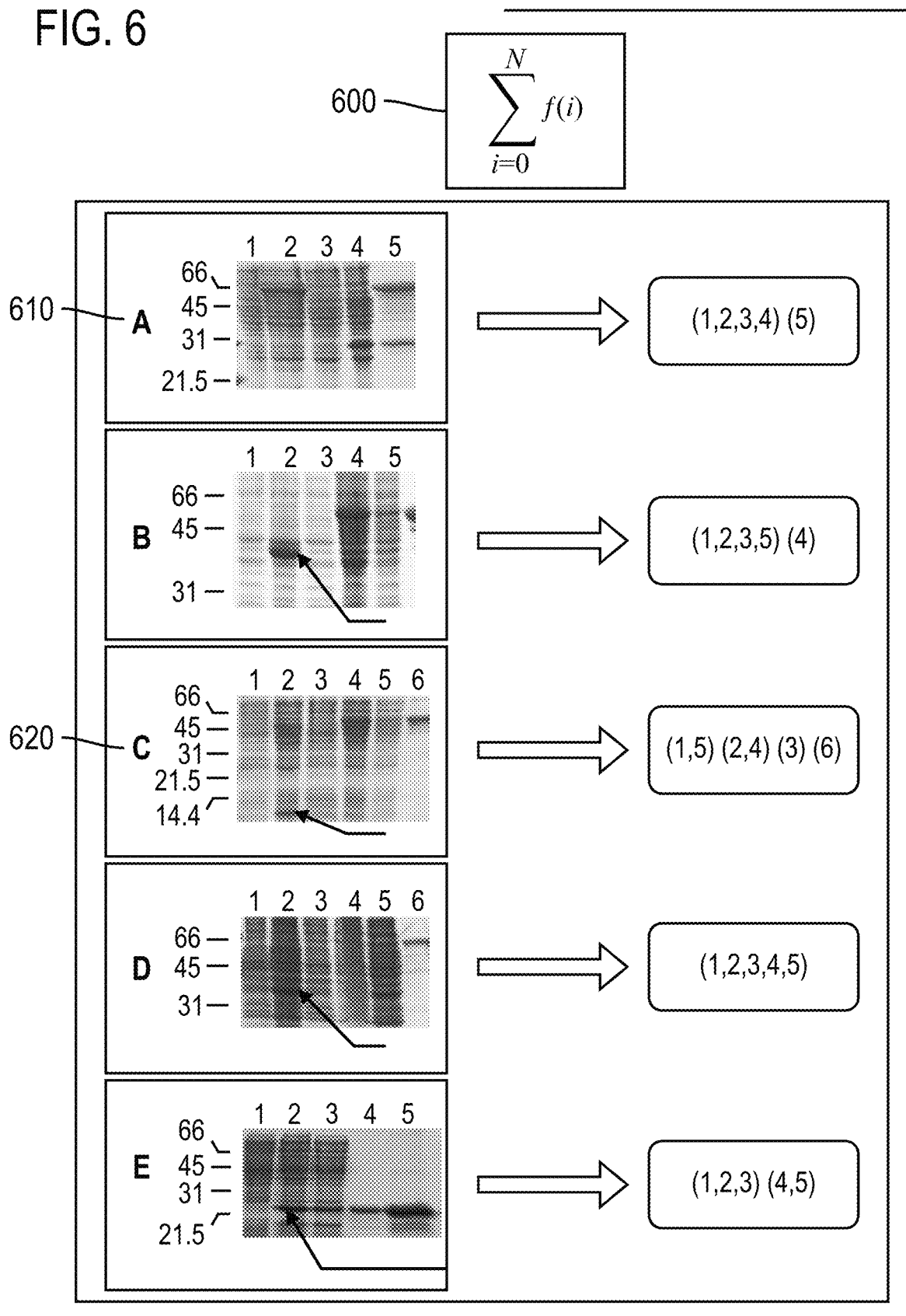
FIG. 6 illustrates, in a flowchart, operations for processing time series records in accordance with certain embodiments.

FIG. 6 illustrates an example of affinity detection in accordance with certain embodiments. For each timestamp, the time series record affinity detector 120 uses an equation 600 to obtain a total occurrence of each combination of existing tags P(i, j). In FIGS. 6, A, B, C, and D each represent time series record sets. For example, for time series record set A 610, tags (1, 2, 3, 4) have affinity to each other based on the tags occurring together at particular timestamps often. For time series record set C 620, tags (1, 5) have affinity to each other based on the tags occurring together at particular timestamps often and tags (2, 4) have affinity to each other based on the tags occurring together at particular timestamps often. In these examples, tag 1 may be a "host" tag, tag 2 may be a "pool" tag, tag 3 may be a "location" tag, etc.

The time series record affinity detector 120 aggregates the result to determine the affinity of tags. In certain embodiments, values in the chronological matrix are aggregated to determine the affinity values of the tags. In certain embodiments, the time series record affinity detector 120 calculates the affinity value for a pair of tags and compares that to an affinity threshold. In certain embodiments, the higher the affinity value, the more likely the pattern exists across timeslots.

Figure 7:
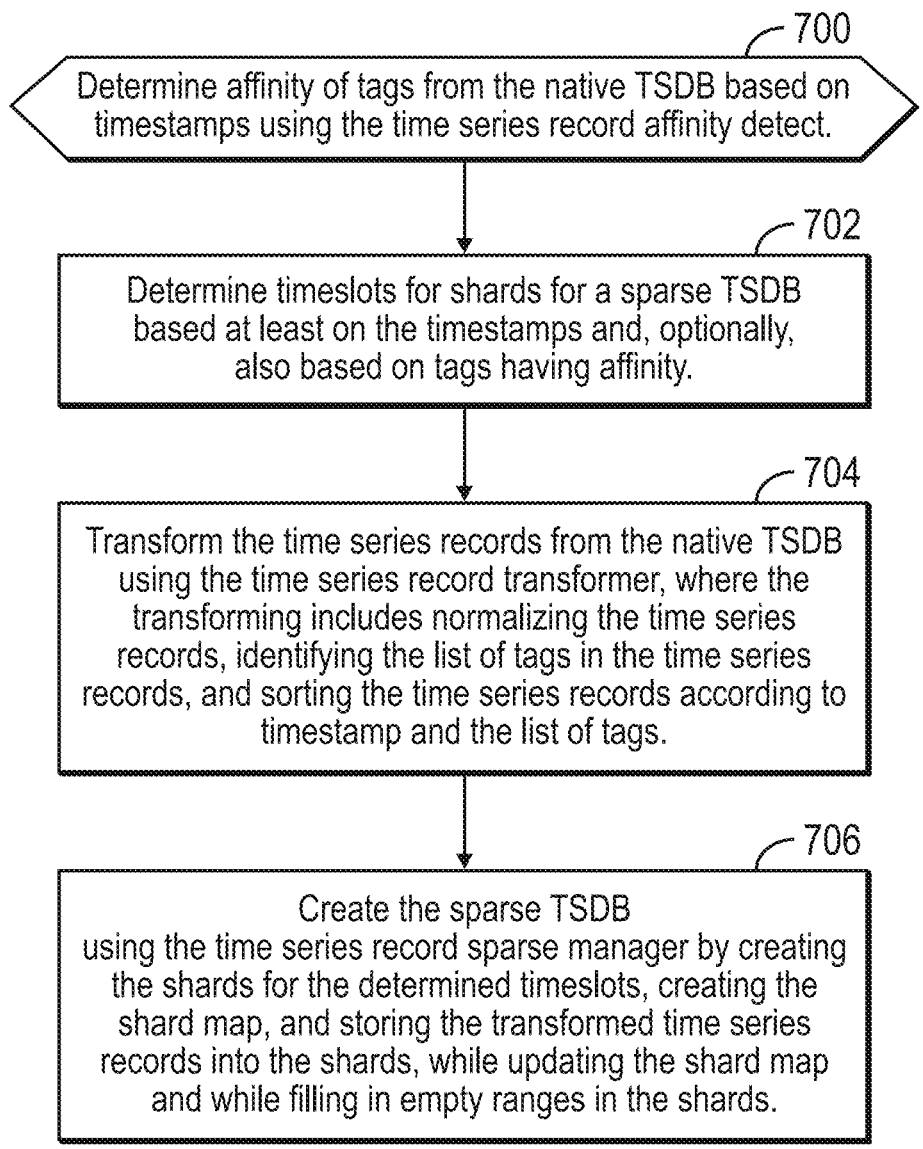
FIG. 7 illustrates an example of affinity detection in accordance with certain embodiments.

FIG. 7 illustrates, in a flowchart, operations for processing time series records in accordance with certain embodiments. Control begins at block 700 with the sparse TSDB manager 100 determining affinity of tags from the native TSDB 170 based on timestamps using the time series record affinity detector 120. In block 702, the sparse TSDB manager 100 determines timeslots for shards for the sparse TSDB based at least on the timestamps and, optionally, also based on tags having affinity (e.g., tags for geographic locations or other tags) using the time series record shard manager 122. In block 704, the sparse TSDB manager 100 transforms the time series records from the native TSDB 170 using the time series record transformer 124, where the transforming includes normalizing the time series records, identifying the list of tags in the time series records, and sorting the time series records according to timestamp and the list of tags. In block 706, the sparse TSDB manager 100 creates the sparse TSDB 190 using the time series record sparse manager 126 by creating the shards for the determined timeslots, creating the shard map, and storing the transformed time series records into the shards, while updating the shard map and while filling in empty ranges in the shards.

The time series record shard manager 122 manages the shards. The time series record shard manager 122 determines the shards and a shard map for the shards based on chronological metrics (e.g., timestamps) and optionally in combination with tags for location (e.g., a geographic location and the shards may be created based on the timeslot and the geographic location) and/or other tags (e.g., the tags are for different hosts, and the shards may be created based on the timeslot and a host). In certain embodiments, the shards and the shard map are based on the timeslot, the geographic location, and a tag (e.g., one shard is created for a month (timeslot), a country (geographic location), and a host (e.g., web42)).

In certain embodiments, the same metric at different timestamps may have different representations of tags (e.g., one date tag is in the format of month-date-year for the metric at a first timestamp, while another date tag is in the format of year-month-date for that metric at a second timestamp), and such different representations may be normalized to one format.

The time series record shard manager 122 adjusts the number of shards and updates the shard map if new metrics are found in the time series records or existing metric values change. For example, the time series record shard manager 122 may add shards, split shards, merge shards, etc. When the number of shards changes, this may lead to time series records being re-distributed among the shards, which leads to updates in the shard map (as the shard map is the index to the time series records in the shards).

Figure 8:
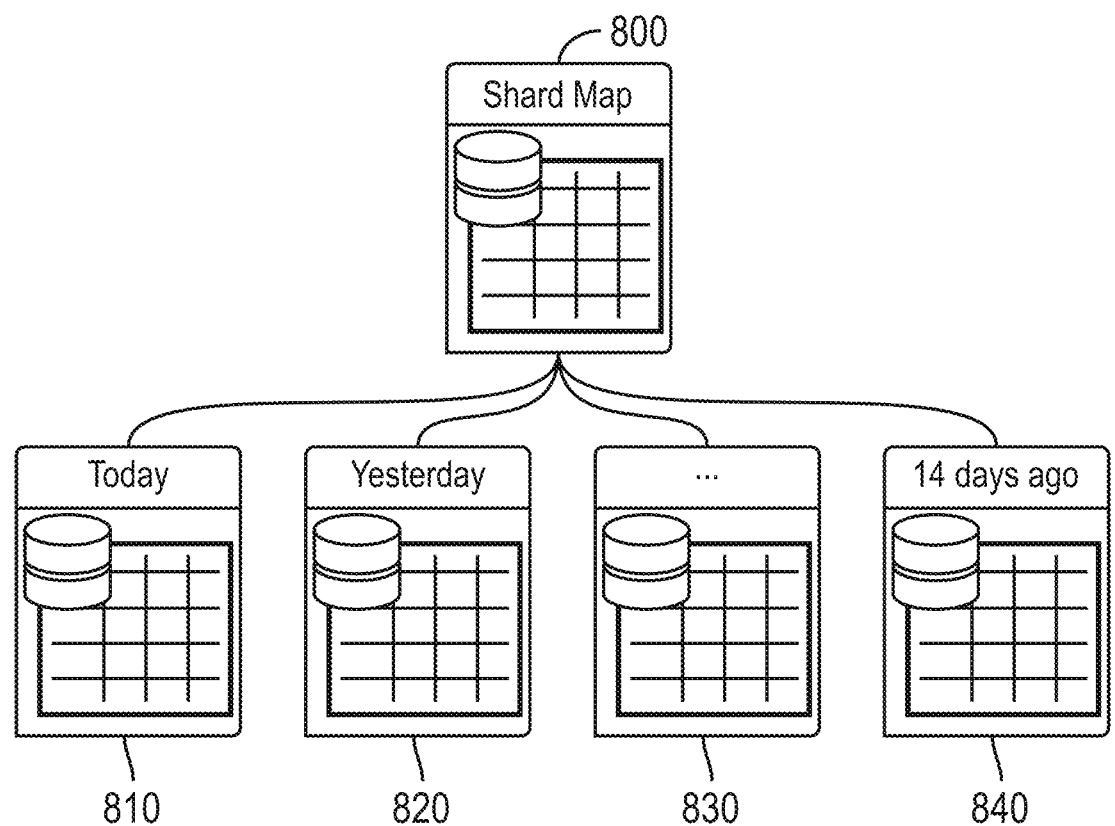
FIG. 8 illustrates examples of a shard map and shards in accordance with certain embodiments.

FIG. 8 illustrates examples of a shard map 800 and shards 810, 820, 830, 840 in accordance with certain embodiments. The shards 810, 820, 830, 840 are partitioned based on timeslots (e.g., today, yesterday, . . . , 14 days ago). For example, tags associated with "today" have an affinity with each other based on time and are stored in shard 810, tags associated with "yesterday" have an affinity with each other based on time and are stored in shard 820, tags associated with "14 days ago" have affinity with each other based on time and are stored in shard 840. A shard map 800 (i.e., an index) stores metadata for the shards 810, 820, 830, 840. In particular, the shard map 800 has entries with keys, and each of the keys maps to a portion of a shard.

In certain embodiments a column qualifier (e.g., a time series record name) has the following format:

ColumnQualifier(Offset+Value Type+Value Length)

Figure 9:
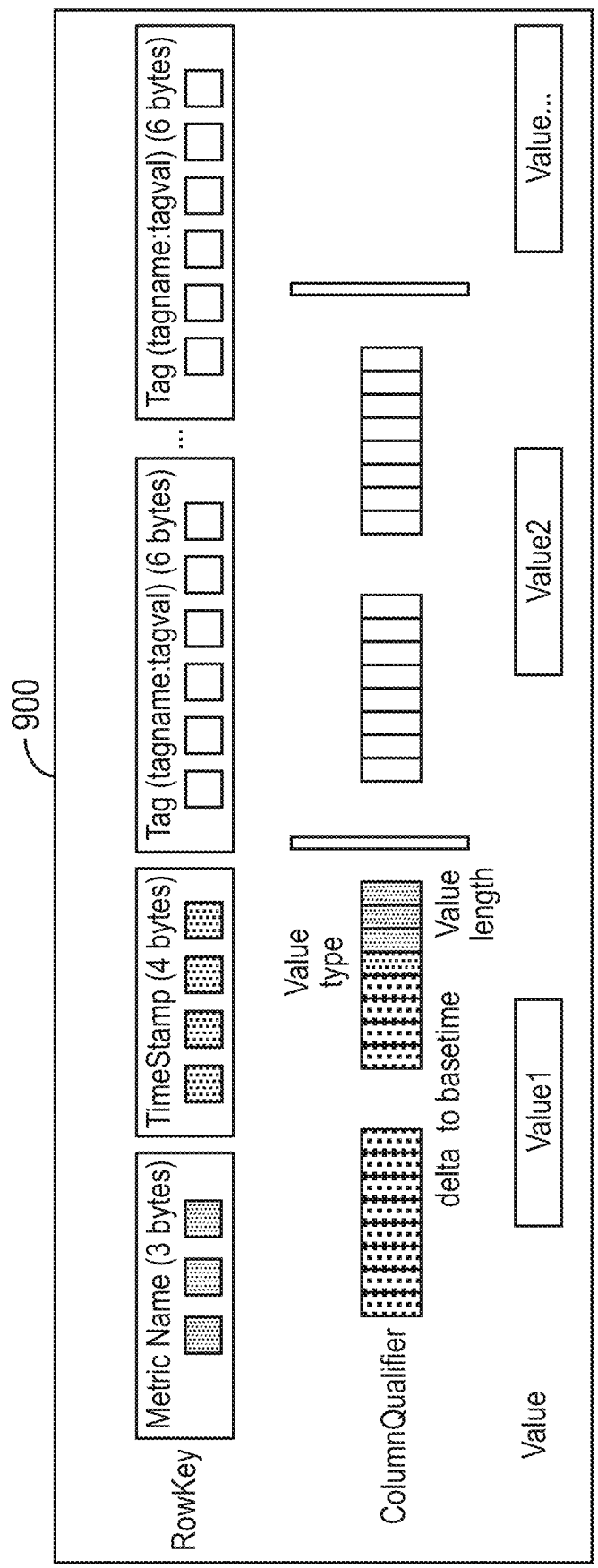
FIG. 9 illustrates an example of a time series record in accordance with certain embodiments.

FIG. 9 illustrates an example of a time series record 900 in accordance with certain embodiments. The time series record 900 represents how the time series record is saved. The time series record 900 includes in the first row: a metrics name, a timestamp, and tags. The time series record 900 includes in the second row a column qualifier from delta to baseline, which represents how time series records are saved from the baseline and appended one by one. The time series record 900 indicates in the third row the values of the metric and tags of the time series record 900.

The time series record transformer 124 performs transformation by: normalizing the time series records, identifying the list of tags in the time series records, and sorting the time series records according to timestamp and then by tag list. In certain embodiments, the time series records are sorted by timestamp. In certain additional embodiments, for each group of time series records with the same timestamp, the time series records may be sorted based on tags for geographic location, and, for each group of time series records with the same timestamp and the same geographic location, the time series records may be further sorted by one or more other tags (e.g., "host" tag, "pool" tag, etc.).

In certain embodiments, the time series record transformer 124 normalizes the time series records and uses consistent units. In certain embodiments, the native TSDB 170 is a multi-dimensional data model, and time is one of the dimensions. The time series record transformer 124 identifies the list of tags in the time series records from the metrics knowledge base 180, decides the order of the tags in the list of tags, and sorts the time series records by the timestamp and by the list of tags.

Figure 10:
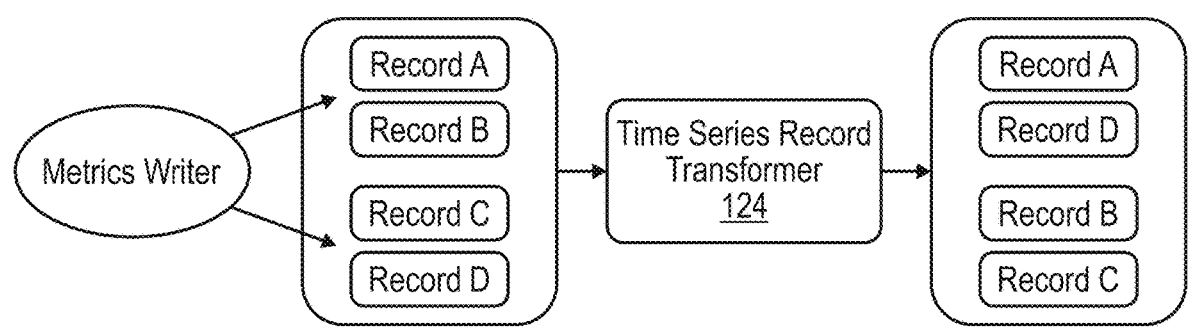
FIG. 10 illustrates another example of time series record transformation in accordance with certain embodiments.

FIG. 10 illustrates an example of time series record transformation in accordance with certain embodiments. In this example, the time series record transformer 124 receives time series records Record A, Record B, Record C, and Record D (from a metrics writer that retrieves the time series records from the native TSDB 170 for the time series record transformer 124) and transforms them to the order of Record A, Record D, Record B, and Record C based on timestamp and then based on tag list (e.g., based on timestamp, then tags for geographic location, and then other tags). However, in other embodiments, the time series records may be ordered based on timestamp alone or may be ordered based on timestamp and then other tags (other than the geographic location tag).

The time series record sparse manager 126 constructs the tag matrix and finds gaps in the tag matrix. In certain embodiments, according to a pre-determined sparse threshold (which may be modified by a user, such as a system administrator), the time series record sparse manager 126 fills in the empty range in the native TSDB with null values and/or default values. In certain embodiments zone maps are used to find the place in the sparse TSDB 190 to store the time series record. In addition, embodiments provide the sparse TSDB 190 and TSDB indexing with fast techniques that operate on compressed data with good storage throughput.

The time series record sparse manager 126 constructs a tag matrix for time series records, defines the sparse threshold for using the sparse TSDB 190 or the native TSDB stream 170, fills in the tag matrix (according to the transformed time series records TSDB), finds the gaps in the tag matrix, and fills in the empty range. In addition, the time series record sparse manager 126 adjusts the sparse threshold according to query usage for the sparse TSDB 190. In certain embodiments, the sparse threshold is based on historical learning and similarity of queries stored in the historical data 184 in the metrics knowledge base 180. In certain embodiments, if a query does not find certain time series records often, those time series records may move from the sparse TSDB 190 to the native TSDB 170. Using this, embodiments deduce the sparse threshold to decide when to move time series records.

In certain embodiments, the time series record sparse manager 126 issues a create table statement in the following format:

CREATE TABLE metrics (metric_name text, ts timestamp, properties text, key(metric_name, ts))

Figure 11:
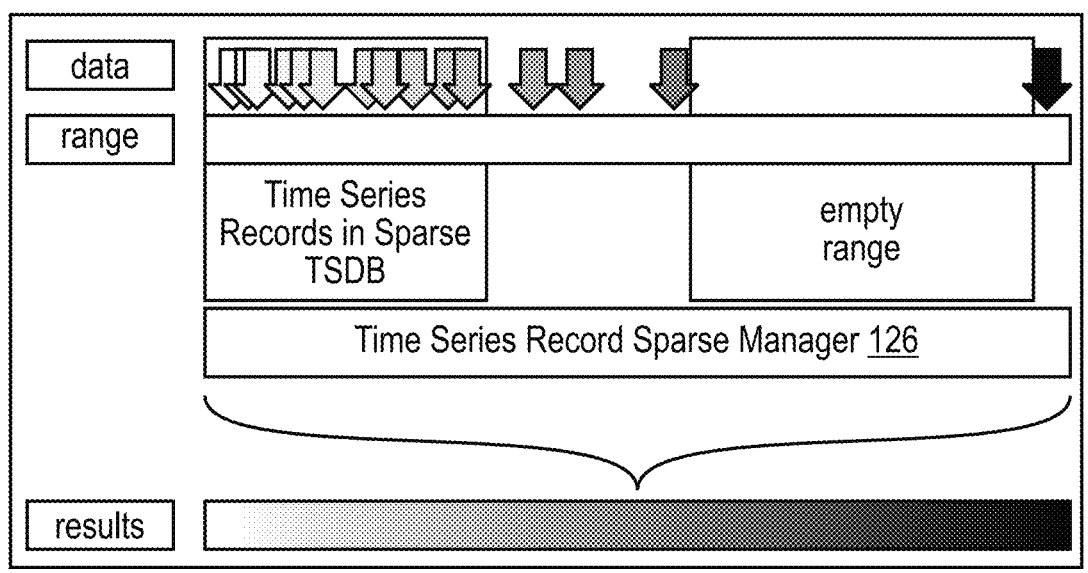
FIG. 11 illustrates an example of processing by the time series record sparse manager in accordance with certain embodiments.

FIG. 11 illustrates an example of processing by the time series record sparse manager 124 in accordance with certain embodiments. In FIG. 11, data is received in a range, with part of the range being empty, and the time series record sparse manager 126 outputs results with the empty range filled in.

Figure 12:
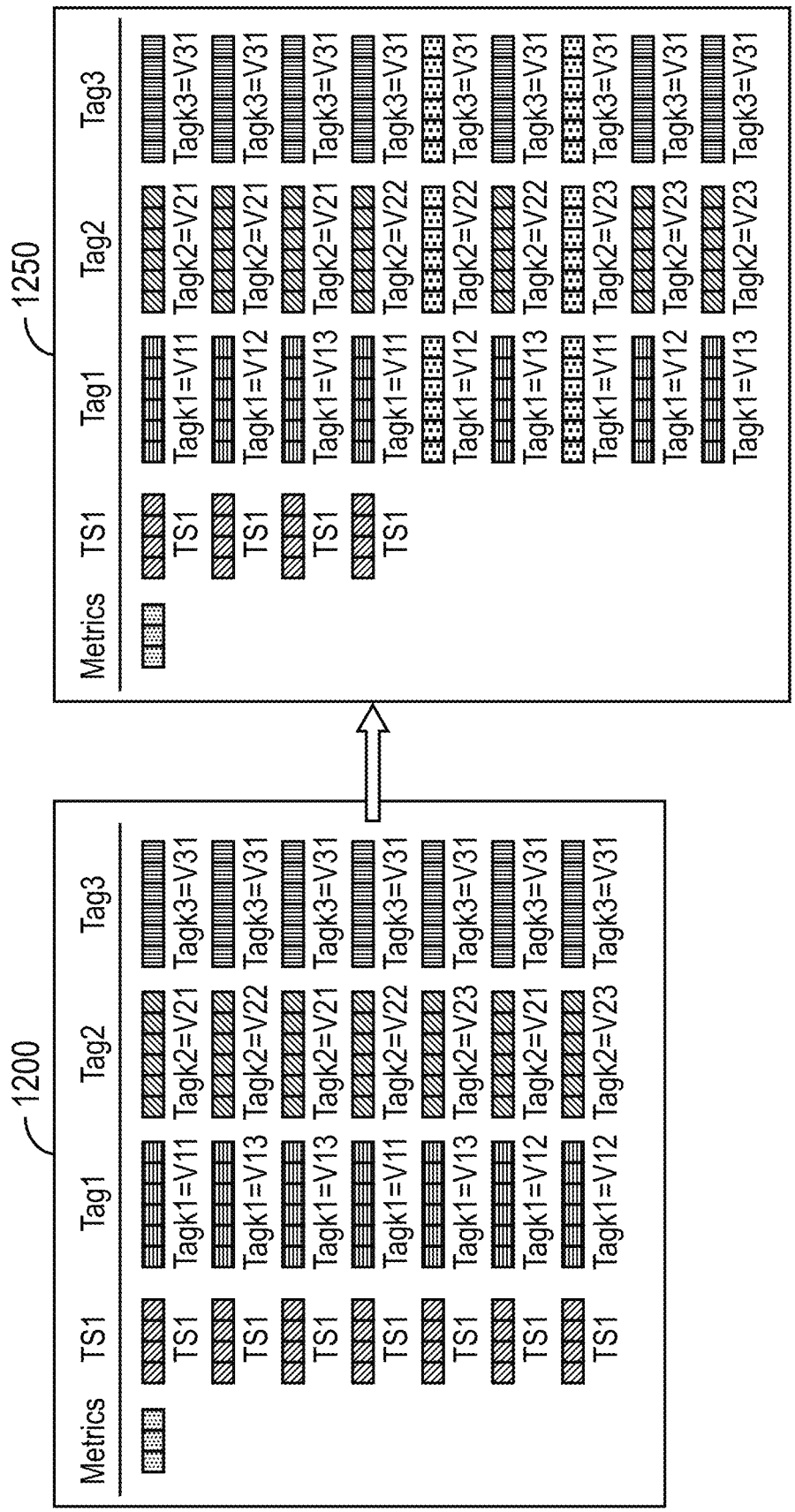
FIG. 12 illustrates a native TSDB and a sparse TSDB in accordance with certain embodiments.

FIG. 12 illustrates a native TSDB 1200 and a sparse TSDB 1250 in accordance with certain embodiments. In certain embodiments, if the density of the time series records in the native TSDB 170 is larger than a sparse threshold, the time series record sparse manager 126 fills in the empty range and generates the sparse TSDB 1250, otherwise, the time series record sparse manager 126 uses the native TSDB for random access. In certain embodiments, the time series record sparse manager 126 generates a metadata table 186 that indicates whether to use a sparse TSDB 1250 or a native TSDB 1200 and indicates the locations of empty ranges and the valid data.

The query manager 130 executes the query with the query parser 132 parsing the query, the query optimizer 134 optimizing the query, the query rewriter 136 rewriting the query, and then passing the rewritten query to the query record access manager 140.

If there is no sparse TSDB 190, the query record access manager 140 executes the query against the native TSDB 170 using random access 164. If there is a sparse TSDB 190, the time series record shift manager 150 determines to use the sparse TSDB 190 for time series records that are used and queried frequently and when the density of the time series records of the native TSDB 170 is larger than the sparse threshold, otherwise, the time series record shift manager 150 determines to use the native TSDB 170. The query record access manager 140 executes the query against the sparse TSDB 190 using MMap 160 or direct access 162 or executes the query against the native TSDB 170 using random access 164. The query result aggregator 142 aggregates the results to output the query result 144.

Figure 13:
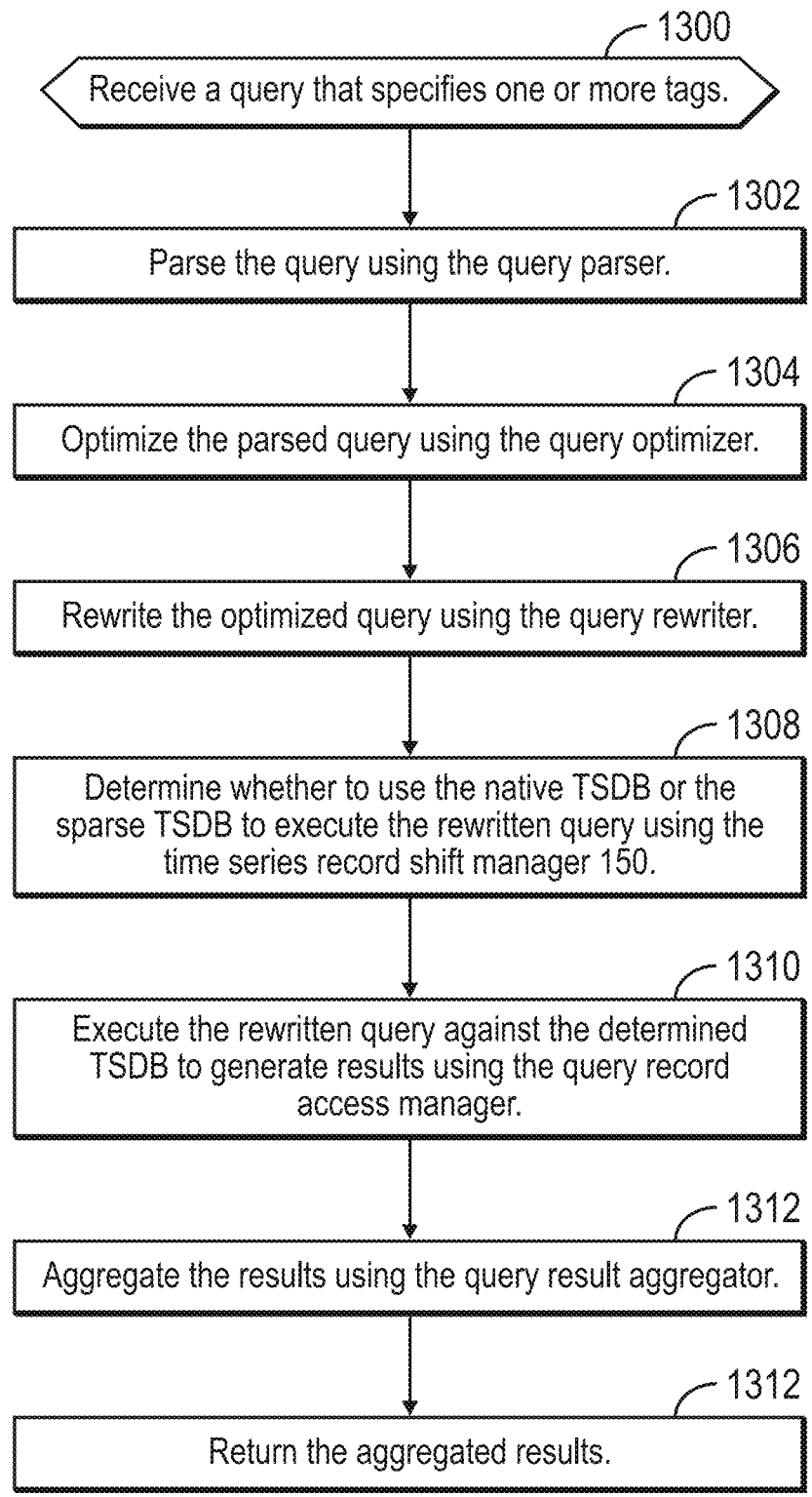
FIG. 13 illustrates, in a flowchart, operations for generating a query result in accordance with certain embodiments.

FIG. 13 illustrates, in a flowchart, operations for generating a query result in accordance with certain embodiments. Control begins at block 1300 with the sparse TSDB manager 100 receiving a query that specifies one or more tags from an entity 50. In block 1302, the sparse TSDB manager 100 parses the query using the query parser 132. In block 1304, the sparse TSDB manager 100 optimizes the parsed query using the query optimizer 134. In block 1306, the sparse TSDB manager 100 rewrites the optimized query using the query rewriter 136.

In block 1308, the sparse TSDB manager 100 determines whether to use the native TSDB 170 or the sparse TSDB 190 to execute the rewritten query using the time series record shift manager 150. In block 1310, the sparse TSDB manager 100 executes the rewritten query against the determined TSDB to generate results using the query record access manager 140. In block 1312, the sparse TSDB manager 100 aggregates the results using the query result aggregator 142. In block 1314, the sparse TSDB manager 100 returns the aggregated results to the entity that issued the query.

The time series records of the sparse TSDB 190 are sorted, split, compressed, and stored. In certain embodiments, this means that execution of the query does not scan the entire table using metadata, and, instead accesses the time series records using constant sequential I/O with optional background optimization. With this, when dealing with trillion row tables, inserting many billions of rows daily, queries execute quickly (e.g., in seconds).

Figure 14:
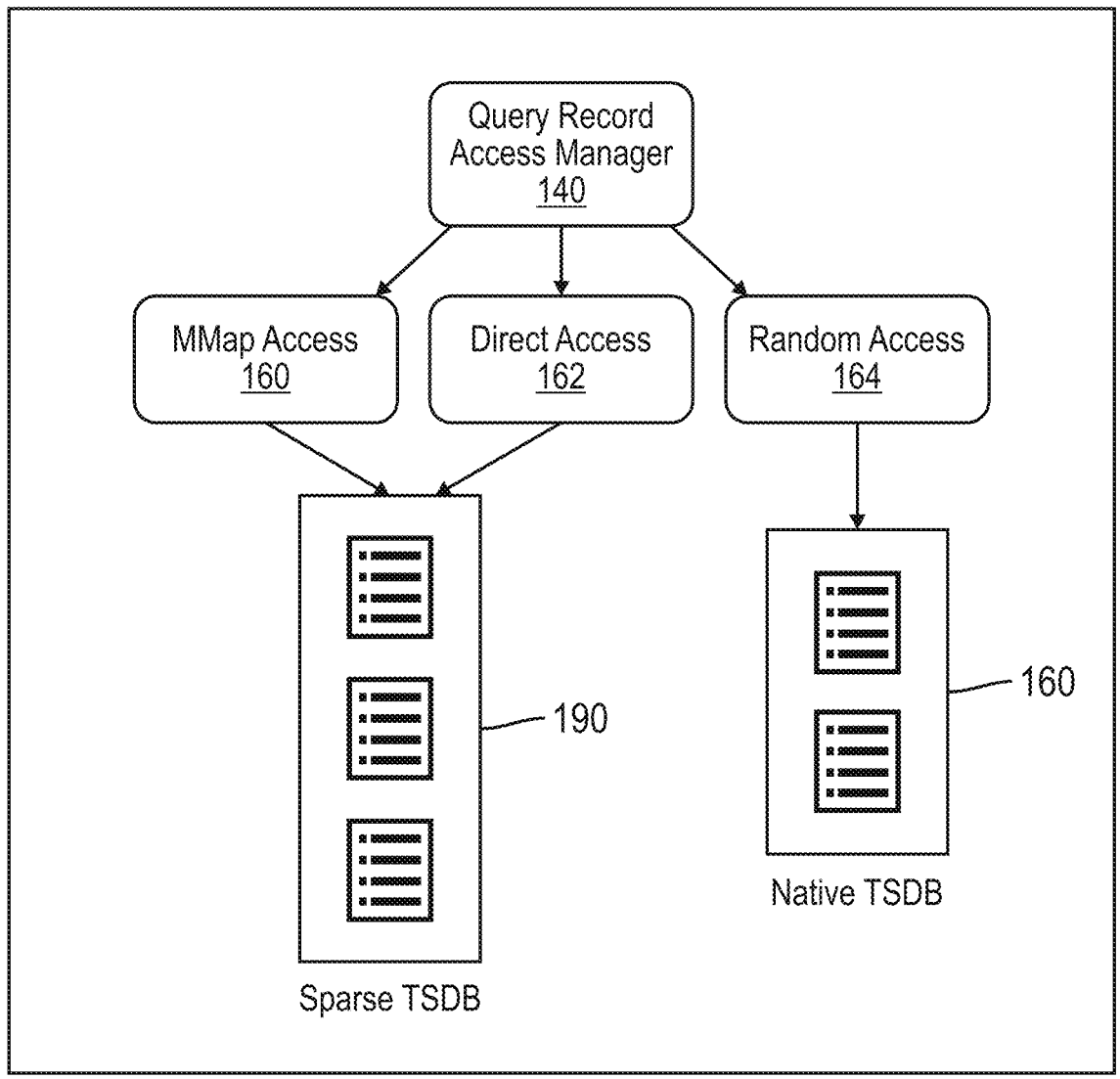
FIG. 14 illustrates access of TSDB time series records in accordance with certain embodiments.

FIG. 14 illustrates access of TSDB time series records in accordance with certain embodiments. In certain embodiments, there are three approaches to access TSDB time series records according to organization of data: MMap access 160 of the sparse TSDB 190, direct access 162 of the sparse TSDB 190, and random access 164 of the native TSDB 170.

In certain embodiments, on disk, the metrics and tags of the TSDB time series records may be organized in a columnar style format. In such a format, instead of storing the metrics and tags row by row, embodiments store the metrics and tags column by column. Thus, for aggregation for one column, embodiments may retrieve data for that one column from continuous blocks of storage on the disk. In such embodiments, this applies to the timestamp column or any of the metric or tag columns. Thus, embodiments advantageously calculate aggregates on a single timestamp, metric or tag with a fast operation. In certain embodiments, direct access of the sparse TSDB 190 starts at: Offset=start+ number of tags (i−1)+i.

The time series record shift manager 150 manages the lifecycle of the sparse TSDB 190. In certain embodiments, the time series record shift manager 150 uses the sparse TSDB 190 to store time series records that are queried more frequently (than other time series records) and when the density of the time series records in the native TSDB 170 are larger than a sparse threshold. In certain embodiments, the density of the native TSDB 170 may be described as:

(total time series records−empty time series records)/ total time series records In certain embodiments, the time series record shift manager 150 converts the sparse TSDB 190 back to the native TSDB 170 over time by moving time series records from the sparse TSDB 190 to the native TSDB 170 that have less frequent access (than other time series records) or when the density of the time series records of the native TSDB 170 is below or equal to the sparse threshold.

Figure 15:
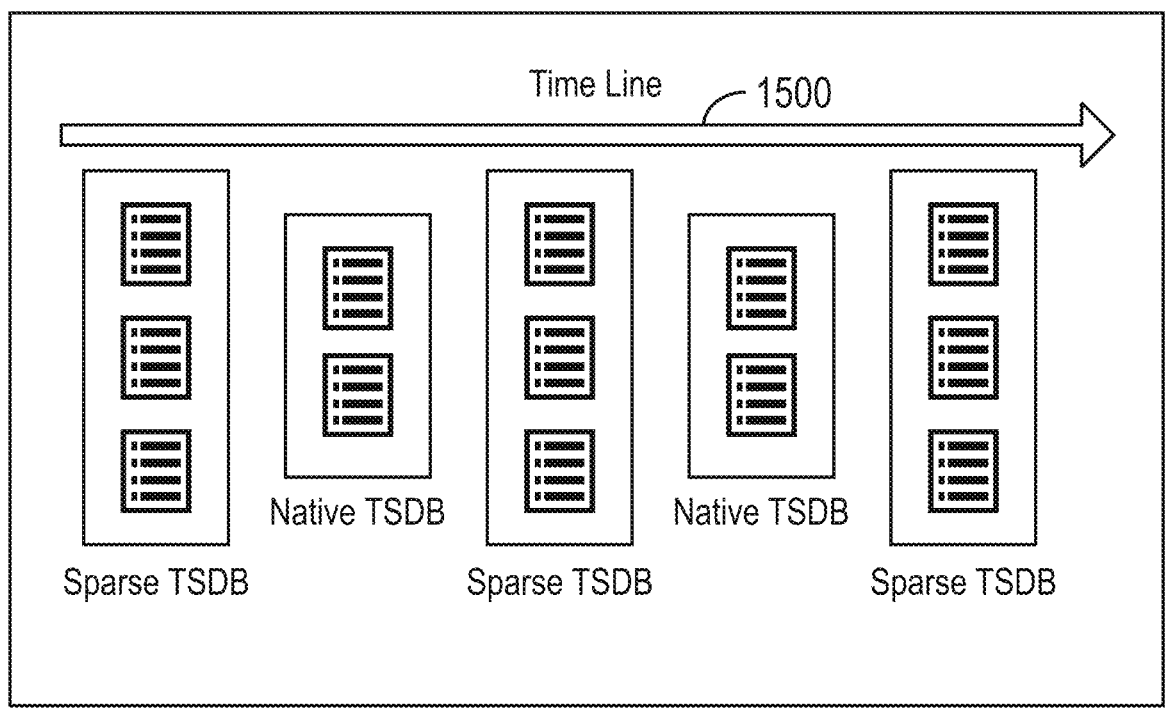
FIG. 15 illustrates the sparse TSDB and the native TSDB along a time line in accordance with certain embodiments.

FIG. 15 illustrates the sparse TSDB and the native TSDB along a time line 1500 in accordance with certain embodiments. The time series record shift manager 150 decides when and how to use the sparse TSDB 190. In certain embodiments, the time series record shift manager 150 determines to use the sparse TSDB 190 for time series records that are used and queried frequently and when the density of the time series records of the native TSDB 170 is larger than the sparse threshold, otherwise, the time series record shift manager 150 determines to use the native TSDB 170. For example, if a query against the TSDB is not frequent, the time series records identified by executing that query may be moved from the sparse TSDB 190 to the native TSDB 170. Similarly, if the query against the TSDB is frequent, the time series records identified by executing that query may be moved from the native TSDB 170 to the sparse TSDB 190.

In certain embodiments, for every data point that goes into the sparse TSDB 190 and the native TSDB 170, that data point is deleted after its period of time (for life cycle/ retention management) is up.

Figure 16A:
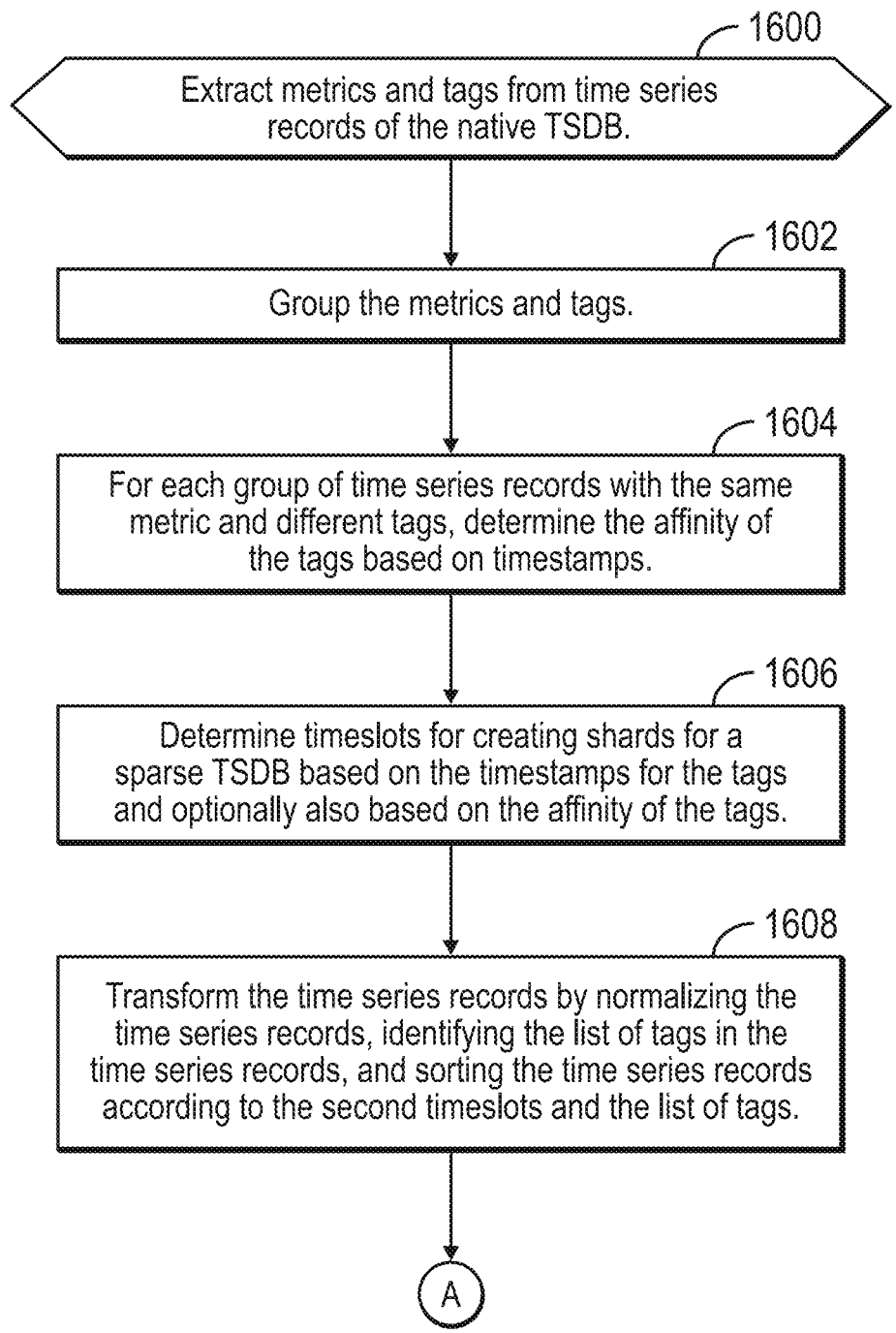
FIGS. 16A and 16B illustrate, in a flowchart, operations for executing a query with one or more tags in accordance with certain embodiments.
Figure 16B:
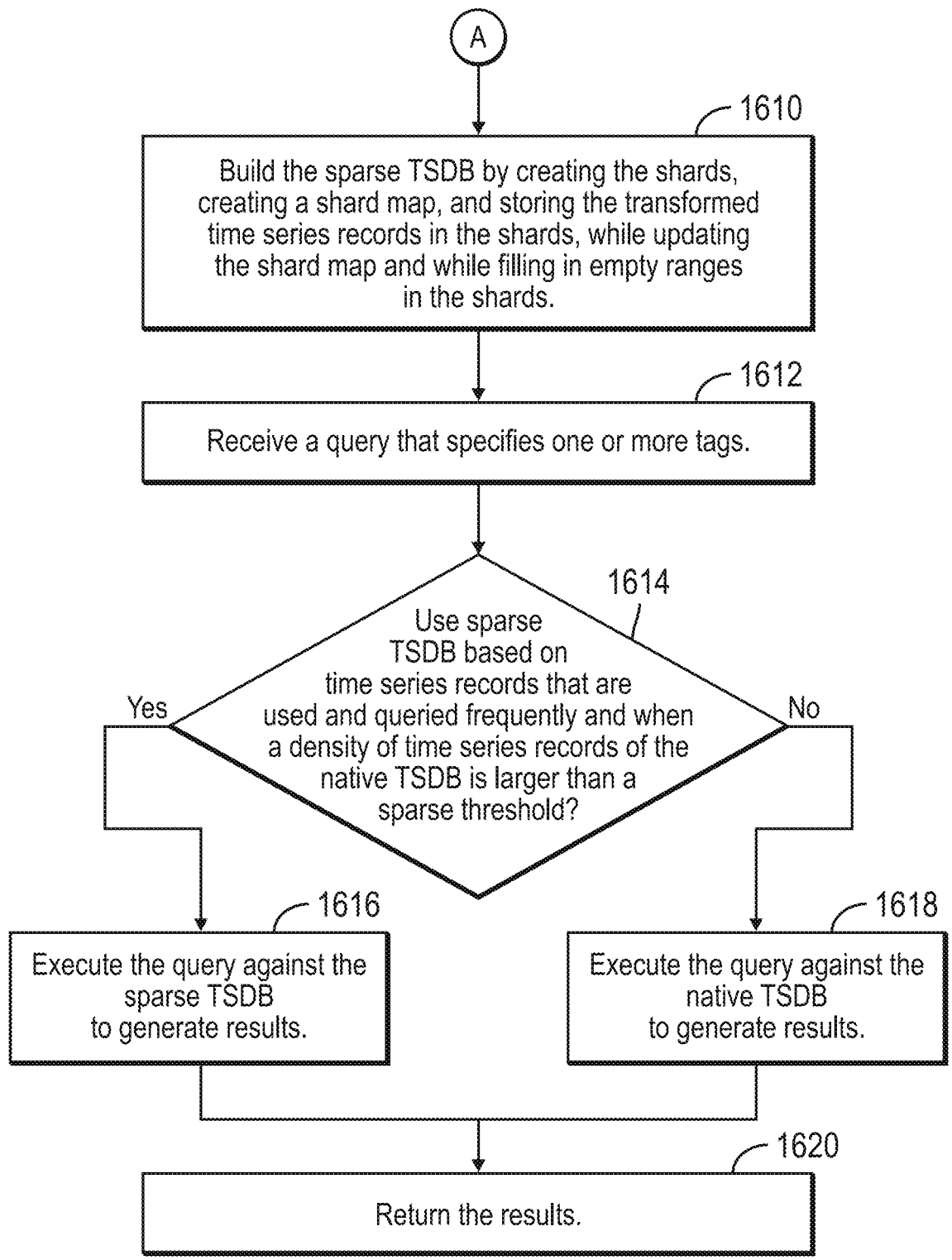

FIGS. 16A and 16B illustrate, in a flowchart, operations for executing a query with one or more tags in accordance with certain embodiments. Control begins at block 1600 with the sparse TSDB manager 100 extracting metrics and tags from time series records of the native TSDB 170. In certain embodiments, the native TSDB 170 is built with shards associated with first timeslots. In block 1602, the sparse TSDB manager 100 groups the metrics and tags.

In block 1604, for each group of time series records with the same metric and different tags, the sparse TSDB manager 100 determines the relationships of the tags based on timestamps. In block 1606, the sparse TSDB manager 100 determines timeslots for which shards are to be created for a sparse TSDB 190 based on the timestamps and, optionally, also based on the affinity of the tags (i.e., based on the timestamps in combination with one or more tags (e.g., tags for the geographic locations and/or other tags of the time series records)).

In block 1608, the sparse TSDB manager 100 transforms the time series records by normalizing the time series records, identifying the list of tags in the time series records, and sorting the time series records according to the second timeslots and the list of tags. From block 1608 (FIG. 16A), processing continues to block 1610 (FIG. 16B).

In block 1610, the sparse TSDB manager 100 builds the sparse TSDB 190 by creating the shards, creating a shard map, and storing the transformed time series records in the shards, while updating the shard map and while filling in empty ranges in the shards.

In block 1612, the sparse TSDB manager 100 receives a query that specifies one or more tags. The following is an example query Q:

http://localhost:4242/api/query?start=1h-
       ago&m=procloadavg.1m{host=web42,
       pool=static}

In block 1614, the sparse TSDB manager 100 determines whether to execute the query against the sparse TSDB 190 based on time series records that are used and queried frequently and when the density of records of the native TSDB is larger than a sparse threshold. If the sparse TSDB 190 is to be used, processing continues to block 1616, otherwise, processing continues to block 1618. In certain embodiments, the sparse TSDB manger 100 makes the determination of block 1614 using a metadata table 186 that indicates whether to use a sparse TSDB 1250 or a native TSDB 1200 and indicates the locations of empty ranges and the valid data and/or based on similarity of the currently received query to historical, previous queries and which TSDB was used for those historical, previous queries.

In block 1616, the sparse TSDB manager 100 executes the query against the sparse TSDB 190 to generate results. In block 1618, the sparse TSDB manager 100 executes the query against the native TSDB 170 to generate results. In block 1620, the sparse TSDB manager 100 returns the results. The following are sample results for the sample query Q:

```
[
  {
    "metric": "proc.loadavg.1m",
    "tags": {
      "host": "web42",
      "pool": "static"
    },
    "tsuids": [
      "0102050101"
    ],
    "dps": {
      "1346846400": 18,
      "1346846460": 20,
      ... }
  }
]
```

Embodiments provide a paradigmatic shift in building, monitoring, controlling, and managing TSDB systems.

Certain embodiments utilize the time series record analyzer 110 to analyze time series records and extract metrics and tags along with their relationship. Certain embodiments utilize the metrics tag affinity detector 120 to analyze affinity of multiple combination of tags for given timeslot and decide the selection of shard map for multiple metrics input. Certain embodiments utilize the time series record transformer 124 to normalize the time series records, identify a list of tags in the time series records, and sort the time series records according to timestamp and the list of tags. Certain embodiments construct the tag matrix in the time series record sparse manager 126, find gaps in the tag matrix, and, according to a sparse threshold, decide to fill in the empty range in the native TSDB 170, including sharding, zone maps and TSDB indexing. Certain embodiments utilize the query manager 130 to perform a query against the TSDBs 170, 190 by parsing, optimizing, rewriting the query request, and passing the query request to the query record access manager 140. Certain embodiments utilize the sparse TSDB 190 for time series records that are used and queried frequently when the density of the time series records in the native TSDB 170 is larger than the sparse threshold.

Figure 17:
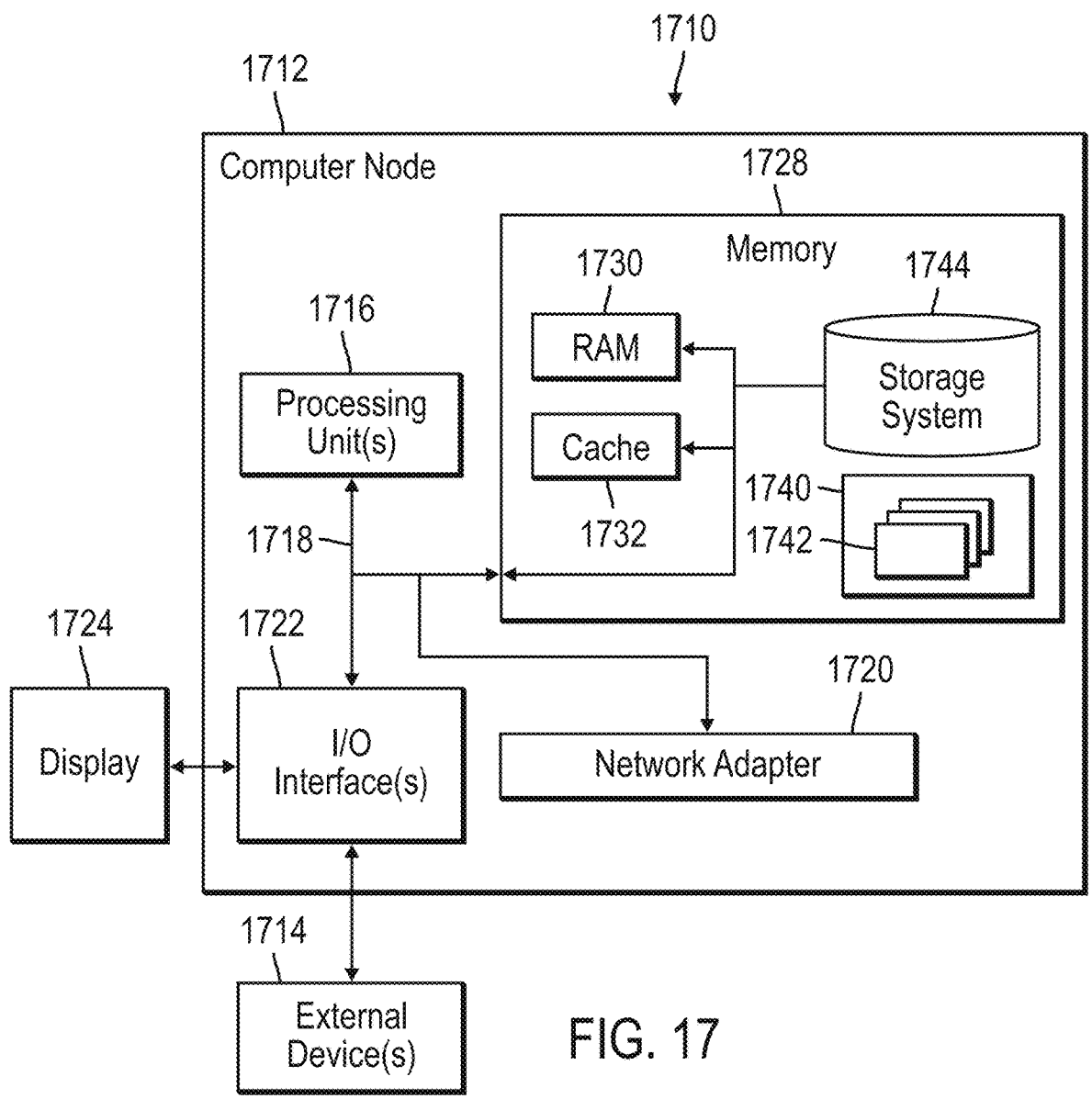
FIG. 17 illustrates a computing node in accordance with certain embodiments.

FIG. 17 illustrates a computing environment 1710 in accordance with certain embodiments. In certain embodiments, the computing environment is a cloud computing environment. Referring to FIG. 17, computer node 1712 is only one example of a suitable computing node and is not intended to suggest any limitation as to the scope of use or functionality of embodiments of the invention described herein. Regardless, computer node 1712 is capable of being implemented and/or performing any of the functionality set forth hereinabove.

The computer node 1712 may be a computer system, which is operational with numerous other general purpose or special purpose computing system environments or configurations. Examples of well-known computing systems, environments, and/or configurations that may be suitable for use with computer node 1712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1712 may be described in the general context of computer system executable instructions, such as program modules, being executed by a computer system. Generally, program modules may include routines, programs, objects, components, logic, data structures, and so on that perform particular tasks or implement particular abstract data types. Computer node 1712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer node 1712 is shown in the form of a general-purpose computing device. The components of computer node 1712 may include, but are not limited to, one or more processors or processing units 1716, a system memory 1728, and a bus 1718 that couples various system components including system memory 1728 to one or more processors or processing units 1716.

Bus 1718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1712 typically includes a variety of computer system readable media. Such media may be any available media that is accessible by computer node 1712, and it includes both volatile and non-volatile media, removable and non-removable media.

System memory 1728 can include computer system readable media in the form of volatile memory, such as random access memory (RAM) 1730 and/or cache memory 1732. Computer node 1712 may further include other removable/non-removable, volatile/non-volatile computer system storage media. By way of example only, storage system 1734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 1718 by one or more data media interfaces. As will be further depicted and described below, system memory 1728 may include at least one program product having a set (e.g., at least one) of program modules that are configured to carry out the functions of embodiments of the invention.

Program/utility 1740, having a set (at least one) of program modules 1742, may be stored in system memory 1728 by way of example, and not limitation, as well as an operating system, one or more application programs, other program modules, and program data. Each of the operating system, one or more application programs, other program modules, and program data or some combination thereof, may include an implementation of a networking environment. Program modules 1742 generally carry out the functions and/or methodologies of embodiments of the invention as described herein.

Computer node 1712 may also communicate with one or more external devices 1714 such as a keyboard, a pointing device, a display 1724, etc.; one or more devices that enable a user to interact with computer node 1712; and/or any devices (e.g., network card, modem, etc.) that enable computer node 1712 to communicate with one or more other computing devices. Such communication can occur via Input/Output (I/O) interfaces 1722. Still yet, computer node 1712 can communicate with one or more networks such as a local area network (LAN), a general wide area network (WAN), and/or a public network (e.g., the Internet) via network adapter 1720. As depicted, network adapter 1720 communicates with the other components of computer node 1712 via bus 1718. It should be understood that although not shown, other hardware and/or software components could be used in conjunction with computer node 1712. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the computing device 60 has the architecture of computer node 1712. In certain embodiments, the computing device 60 is part of a cloud infrastructure. In certain alternative embodiments, the computing device 60 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
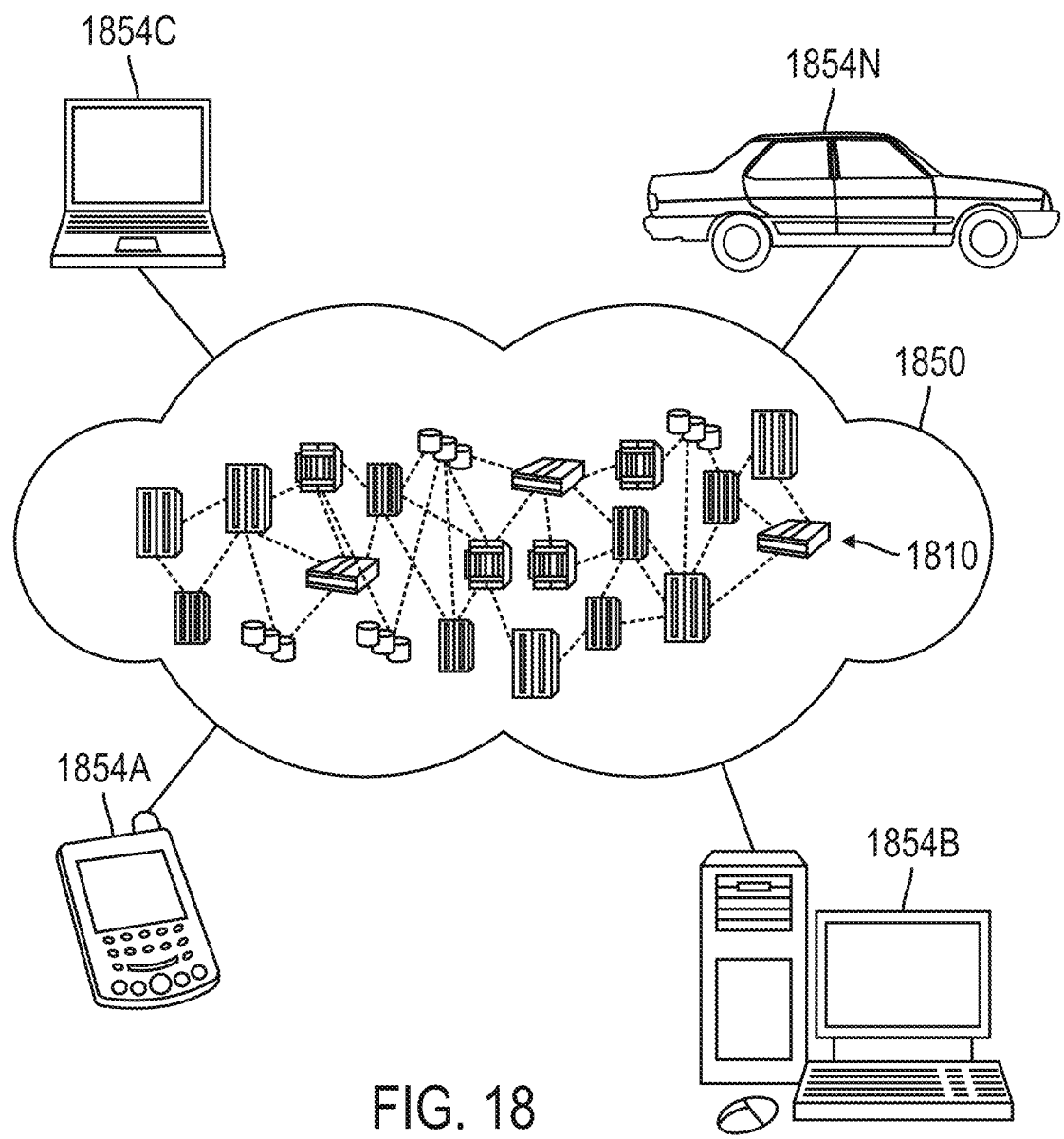
FIG. 18 illustrates a cloud computing environment in accordance with certain embodiments.

Referring now to FIG. 18, illustrative cloud computing environment 1850 is depicted. As shown, cloud computing environment 1850 includes one or more cloud computing nodes 1810 with which local computing devices used by cloud consumers, such as, for example, personal digital assistant (PDA) or cellular telephone 1854A, desktop computer 1854B, laptop computer 1854C, and/or automobile computer system 1854N may communicate. Nodes 1810 may communicate with one another. They may be grouped (not shown) physically or virtually, in one or more networks, such as Private, Community, Public, or Hybrid clouds as described hereinabove, or a combination thereof. This allows cloud computing environment 1850 to offer infrastructure, platforms and/or software as services for which a cloud consumer does not need to maintain resources on a local computing device. It is understood that the types of computing devices 1854A-N shown in FIG. 18 are intended to be illustrative only and that computing nodes 1810 and cloud computing environment 1850 can communicate with any type of computerized device over any type of network and/or network addressable connection (e.g., using a web browser).

Figure 19:
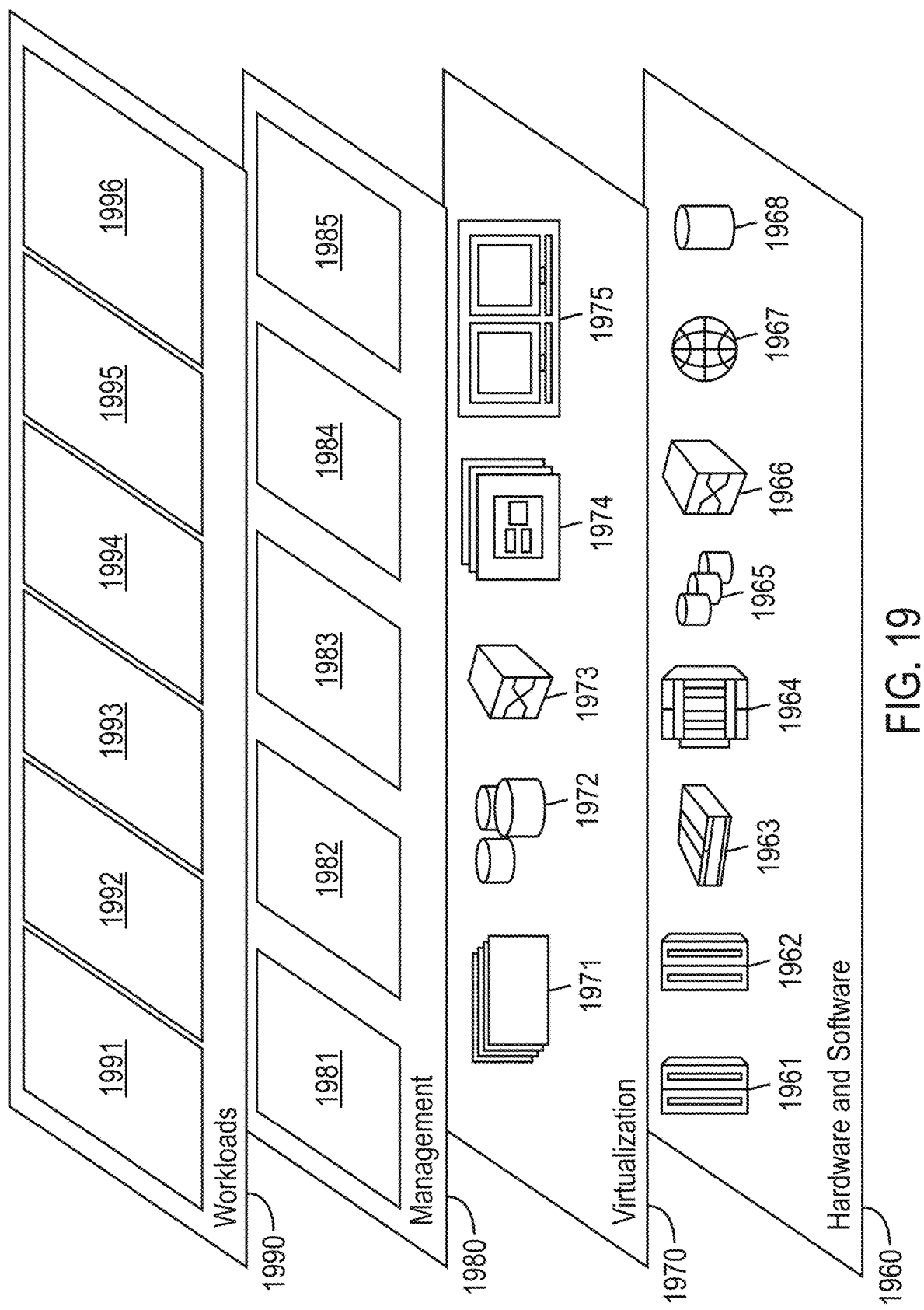
FIG. 19 illustrates abstraction model layers in accordance with certain embodiments.

Referring now to FIG. 19, a set of functional abstraction layers provided by cloud computing environment 1850 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 1960 includes hardware and software components. Examples of hardware components include: mainframes 1961; RISC (Reduced Instruction Set Computer) architecture based servers 1962; servers 1963; blade servers 1964; storage devices 1965; and networks and networking components 1966. In some embodiments, software components include network application server software 1967 and database software 1968.

Virtualization layer 1970 provides an abstraction layer from which the following examples of virtual entities may be provided: virtual servers 1971; virtual storage 1972; virtual networks 1973, including virtual private networks; virtual applications and operating systems 1974; and virtual clients 1975.

In one example, management layer 1980 may provide the functions described below. Resource provisioning 1981 provides dynamic procurement of computing resources and other resources that are utilized to perform tasks within the cloud computing environment. Metering and Pricing 1982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1983 provides access to the cloud computing environment for consumers and system administrators. Service level management 1984 provides cloud computing resource allocation and management such that required service levels are met. Service Level Agreement (SLA) planning and fulfillment 1985 provide pre-arrangement for, and procurement of, cloud computing resources for which a future requirement is anticipated in accordance with an SLA.

Workloads layer 1990 provides examples of functionality for which the cloud computing environment may be utilized. Examples of workloads and functions which may be provided from this layer include: mapping and navigation 1991; software development and lifecycle management 1992; virtual classroom education delivery 1993; data analytics processing 1994; transaction processing 1995; and building and using a sparse time series database (TSDB) 1996.

Thus, in certain embodiments, software or a program, implementing building and using a sparse time series database (TSDB) in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:
receiving time series records from a native Time Series Database (TSDB), wherein each of the time series records includes a timestamp and one or more tags, wherein the native TSDB comprises first shards associated with first timeslots;
determining second timeslots for second shards for a sparse TSDB based on the timestamp included in each of the time series records;
building the sparse TSDB by creating the second shards for the determined second timeslots and storing the time series records in the second shards, while filling in empty ranges in the second shards;

receiving a query that specifies at least one of the one or more tags that identify particular time series records;

determining whetherto execute the query against one of the sparse TSDB and the native TSDB;

in response to determining that the query is to be executed against the sparse TSDB based on determining that the particular time series records are queried more frequently than other time series records identified by other queries based on historical queries and determining that a density of the time series records in the native TSDB is larger than a sparse threshold, executing the query against the sparse TSDB to generate first results;

in response to determining that the query is to be executed against the native TSDB based on one of determining that the particular time series records are queried less frequently than the other time series records identified by the other queries based on the historical queries and determining that the density of the time series records in the native TSDB is less than or equal to the sparse threshold, executing the query against the native TSDB to generate second results; and returning one of the first results and the second results.

2. The computer-implemented method of claim 1, comprising further operations for:

extracting metrics and the one or more tags from the time series records in the native TSDB;

aggregating the metrics based on the one or more tags and based on the timestamp included in each of the time series records; and grouping the metrics and the one or more tags according to the aggregation.

3. The computer-implemented method of claim 1, comprising further operations for:

determining an affinity of the one or more tags based on the timestamp included in each of the time series records.

4. The computer-implemented method of claim 1, comprising further operations for:

transforming the time series records by:
normalizing the time series records;
identifying the one or more tags in the time series records; and
sorting the time series records according to the timestamp included in each of the time series records and the one or more tags.

5. The computer-implemented method of claim 1, wherein the sparse TSDB is accessed by one of Memory Map (MMap) access and direct access, and wherein the native TSDB is accessed by random access.

6. The computer-implemented method of claim 1, wherein a Software as a Service (SaaS) is configured to perform the operations of the computer-implemented method.

7. A computer program product, the computer program product comprising a computer readable storage medium having program code embodied therewith, the program code executable by at least one processor to perform operations for:

receiving time series records from a native Time Series Database (TSDB), wherein each of the time series records includes a timestamp and one or more tags, wherein the native TSDB comprises first shards associated with first timeslots;

determining second timeslots for second shards for a sparse TSDB based on the timestamp included in each of the time series records;

building the sparse TSDB by creating the second shards for the determined second timeslots and storing the time series records in the second shards, while filling in empty ranges in the second shards;

receiving a query that specifies at least one of the one or more tags that identify particular time series records;

determining whetherto execute the query against one of the sparse TSDB and the native TSDB;

in response to determining that the query is to be executed against the sparse TSDB based on determining that the particular time series records are queried more frequently than other time series records identified by other queries based on historical queries and determining that a density of the time series records in the native TSDB is larger than a sparse threshold, executing the query against the sparse TSDB to generate first results;

in response to determining that the query is to be executed against the native TSDB based on one of determining that the particular time series records are queried less frequently than the other time series records identified by the other queries based on the historical queries and determining that the density of the time series records in the native TSDB is less than or equal to the sparse threshold, executing the query against the native TSDB to generate second results; and returning one of the first results and the second results.

8. The computer program product of claim 7, wherein the program code is executable by the at least one processor to perform further operations for:

extracting metrics and the one or more tags from the time series records in the native TSDB;

aggregating the metrics based on the one or more tags and based on the timestamp included in each of the time series records; and grouping the metrics and the one or more tags according to the aggregation.

9. The computer program product of claim 7, wherein the program code is executable by the at least one processor to perform further operations for:

determining an affinity of the one or more tags based on the timestamp included in each of the time series records.

10. The computer program product of claim 7, wherein the program code is executable by the at least one processor to perform further operations for:

transforming the time series records by:
normalizing the time series records;
identifying the one or more tags in the time series records; and
sorting the time series records according to the timestamp included in each of the time series records and the one or more tags.

11. The computer program product of claim 7, wherein the sparse TSDB is accessed by one of Memory Map (MMap) access and direct access, and wherein the native TSDB is accessed by random access.

12. The computer program product of claim 7, wherein a Software as a Service (SaaS) is configured to perform the operations of the computer program product.

13. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

receiving time series records from a native Time Series Database (TSDB), wherein each of the time series records includes a timestamp and one or more tags, wherein the native TSDB comprises first shards associated with first timeslots;

determining second timeslots for second shards for a sparse TSDB based on the timestamp included in each of the time series records;

building the sparse TSDB by creating the second shards for the determined second timeslots and storing the time series records in the second shards, while filling in empty ranges in the second shards;

receiving a query that specifies at least one of the one or more tags that identify particular time series records;

determining whetherto execute the query against one of the sparse TSDB and the native TSDB;

in response to determining that the query is to be executed against the sparse TSDB based on determining that the particular time series records are queried more frequently than other time series records identified by other queries based on historical queries and determining that a density of the time series records in the native TSDB is larger than a sparse threshold, executing the query against the sparse TSDB to generate first results;

in response to determining that the query is to be executed against the native TSDB based on one of determining that the particular time series records are queried less frequently than the other time series records identified by the other queries based on the historical queries and determining that the density of the time series records in the native TSDB is less than or equal to the sparse threshold, executing the query against the native TSDB to generate second results; and returning one of the first results and the second results.

14. The computer system of claim 13, wherein the operations further comprise:

extracting metrics and the one or more tags from the time series records in the native TSDB;

aggregating the metrics based on the one or more tags and based on the timestamp included in each of the time series records; and grouping the metrics and the one or more tags according to the aggregation.

15. The computer system of claim 13, wherein the operations further comprise:

determining an affinity of the one or more tags based on the timestamp included in each of the time series records.

16. The computer system of claim 13, wherein the operations further comprise:

transforming the time series records by:
normalizing the time series records;
identifying the one or more tags in the time series records; and
sorting the time series records according to the timestamp included in each of the time series records and the one or more tags.

17. The computer system of claim 13, wherein a Software as a Service (SaaS) is configured to perform the operations of the computer system.

* * * * *